United States Patent
Zhao et al.

(10) Patent No.: US 10,129,478 B2
(45) Date of Patent: Nov. 13, 2018

(54) SYSTEM AND METHOD FOR SUPPORTING SMOOTH TARGET FOLLOWING

(71) Applicant: SZ DJI TECHNOLOGY CO., LTD., Shenzhen (CN)

(72) Inventors: Cong Zhao, Shenzhen (CN); Minjian Pang, Shenzhen (CN); Rui Li, Shenzhen (CN); You Zhou, Shenzhen (CN); Zhe Liu, Shenzhen (CN); Guyue Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/396,022

(22) Filed: Dec. 30, 2016

(65) Prior Publication Data
US 2017/0134631 A1    May 11, 2017

Related U.S. Application Data

(63) Continuation of application No. PCT/CN2015/089594, filed on Sep. 15, 2015.

(51) Int. Cl.
| | |
|---|---|
| *H04N 5/232* | (2006.01) |
| *G06T 7/70* | (2017.01) |
| *G06T 7/20* | (2017.01) |
| *B64C 39/02* | (2006.01) |
| *G05D 1/12* | (2006.01) |
| *G05D 1/00* | (2006.01) |

(52) U.S. Cl.
CPC ......... *H04N 5/2328* (2013.01); *B64C 39/024* (2013.01); *G05D 1/0094* (2013.01); *G05D 1/12* (2013.01); *G06T 7/20* (2013.01); *G06T 7/70* (2017.01); *B64C 2201/141* (2013.01); *G06T 2207/10032* (2013.01); *G06T 2210/12* (2013.01)

(58) Field of Classification Search
CPC ........... H04N 5/2328; G06T 7/70; G06T 7/20; G06T 2207/10032; G06T 2210/12; B64C 39/024; B64C 2201/141; G05D 1/0094; G05D 1/12
USPC ........................................................ 348/144
See application file for complete search history.

(56) References Cited

U.S. PATENT DOCUMENTS

| | | |
|---|---|---|
| 8,448,858 B1 | 5/2013 | Kundu et al. |
| 8,902,233 B1 | 12/2014 | Shen et al. |
| 2007/0070190 A1* | 3/2007 | Yin .................. G08B 13/19626 348/36 |

(Continued)

FOREIGN PATENT DOCUMENTS

| | | |
|---|---|---|
| CN | 1617170 A | 5/2005 |
| CN | 102087530 A | 6/2011 |

(Continued)

OTHER PUBLICATIONS

"CN 103149939A Translation". Jun. 2013.*

(Continued)

*Primary Examiner* — Zhihan Zhou
(74) *Attorney, Agent, or Firm* — Anova Law Group, PLLC

(57) ABSTRACT

A method for supporting target tracking includes acquiring a target from one or more images captured by an imaging device carried by a movable object, obtaining a relative distance between the movable object and the target, and generating one or more control signals based on the relative distance to direct the movable object to track the target.

26 Claims, 16 Drawing Sheets

(56) References Cited

U.S. PATENT DOCUMENTS

| | | | |
|---|---|---|---|
| 2007/0093945 A1 | 4/2007 | Grzywna et al. | |
| 2008/0055413 A1* | 3/2008 | Hayashi | H04N 5/232 348/169 |
| 2009/0080701 A1 | 3/2009 | Meuter et al. | |
| 2011/0279682 A1* | 11/2011 | Li | H04N 5/23245 348/169 |
| 2011/0304736 A1* | 12/2011 | Evans | H04N 5/33 348/169 |
| 2012/0189162 A1* | 7/2012 | Sawada | G01C 3/08 382/103 |
| 2012/0288152 A1* | 11/2012 | Yano | G06T 7/248 382/103 |
| 2013/0345920 A1 | 12/2013 | Duggan et al. | |
| 2015/0117716 A1* | 4/2015 | Ursin | G06T 7/80 382/106 |
| 2016/0125249 A1* | 5/2016 | Mei | G06K 9/00791 382/103 |

FOREIGN PATENT DOCUMENTS

| | | |
|---|---|---|
| CN | 102902282 A | 1/2013 |
| CN | 102955478 A | 3/2013 |
| CN | 103149939 A | 6/2013 |
| CN | 103455797 A | 12/2013 |
| CN | 103530894 A | 1/2014 |
| CN | 103611324 A | 3/2014 |
| CN | 103871075 A | 6/2014 |
| CN | 104035446 A | 9/2014 |
| CN | 104361770 A | 2/2015 |
| CN | 204360218 U | 5/2015 |
| CN | 104714556 A | 6/2015 |
| CN | 104781781 A | 7/2015 |
| CN | 104820428 A | 8/2015 |
| CN | 104834307 A | 8/2015 |
| JP | H10105712 A | 4/1998 |
| TW | 201235808 A | 9/2012 |

OTHER PUBLICATIONS

The World Intellectual Property Organization (WIPO) International Search Report for PCT/CN2015/089594 dated Jun. 3, 2016, p. 1-4.
The World Intellectual Property Organization (WIPO) International Search Report for PCT/CN2015/100257 May 30, 2016 6 Pages (Including Translation).
The World Intellectual Property Organization (WIPO) International Search Report for PCT/CN2015/093459 Jun. 22, 2016.
The World Intellectual Property Organization (WIPO) International Search Report for PCT/CN2016/074830 Aug. 4, 2016.

* cited by examiner

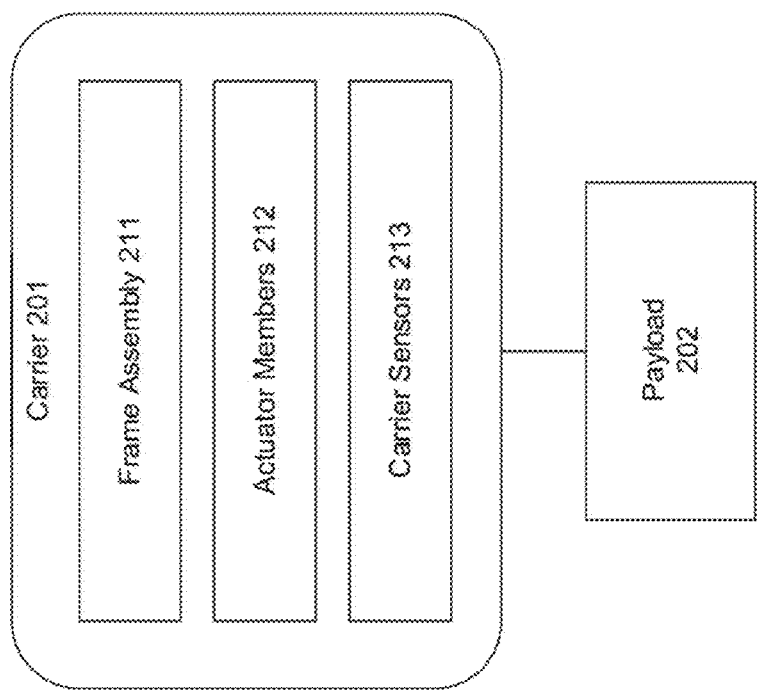
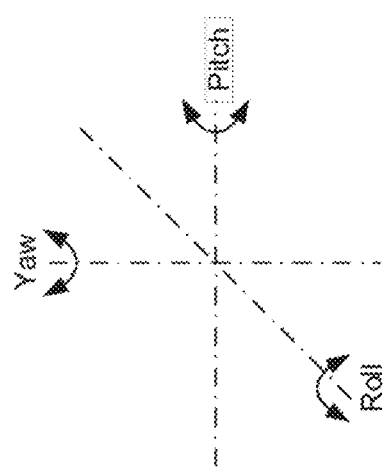
Figure 2

SYSTEM AND METHOD FOR SUPPORTING SMOOTH TARGET FOLLOWING

CROSS-REFERENCE TO RELATED APPLICATION

This is a continuation application of International Application No. PCT/CN2015/089594, filed on Sep. 15, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The disclosed embodiments relate generally to supporting target following and more particularly, but not exclusively, to smooth target following.

BACKGROUND

Aerial vehicles such as unmanned aerial vehicles (UAVs) can be used for performing surveillance, reconnaissance, and exploration tasks for various applications. Due to the great popularity of UAV and high desirability in the UAV market, more attractive functions needs to be added into the UAV. For example, it is desirable to have the UAV tracking object automatically. However, despite the achievements in object tracking in recent years, object tracking remains challenging in computer vision (e.g. the target may undergo deformation, occlusion and even become out of view over a long period of time). This is the general area that embodiments of the disclosure are intended to address.

SUMMARY

Described herein are systems and methods that can support target tracking. A controller can obtain a feature model for a target, wherein the feature model represents imagery characteristics of the target. Furthermore, the controller can extract one or more features from one or more images that are captured by an imaging device carried by a movable object, and can apply the feature model on said one or more features to determine similarity.

Also described herein are systems and methods that can support target tracking. A controller can apply a feature model for a target on an image that is captured for tracking a target to generate a tracking output. Furthermore, the controller can determine that a tracking failure occurs based on the tracking output, and can check one or more subsequent images to detect the target.

Also described herein are systems and methods that can support target tracking. A controller can acquire a target from one or more images, which are captured by an imaging device that is carried by a movable object. Furthermore, the controller can obtain a relative distance between the movable object and the target, and can generate one or more control signals to track the target

BRIEF DESCRIPTION OF DRAWINGS

FIG. 2 illustrates an exemplary carrier in a movable object environment, in accordance with embodiments.

DETAILED DESCRIPTION

The embodiments are illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the disclosure as following uses an unmanned aerial vehicle (UAV) as example for a movable object. It will be apparent to those skilled in the art that other types of movable object can be used without limitation.

In accordance with various embodiments of the present disclosure, the system can automatically track and detect a target for long period of time, e.g. using a movable object such as an unmanned aerial vehicle (UAV), which has limited resource (e.g. both in terms of computing capability and power resource). Additionally, the system can provide re-targeting ability once the target is lost.

Figure 1:
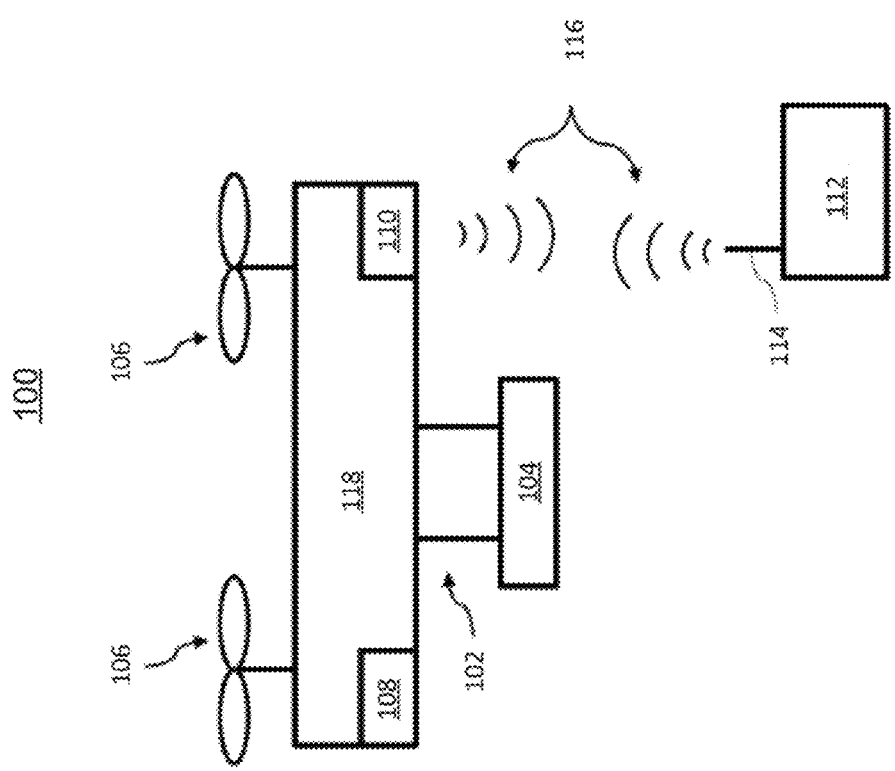
FIG. 1 illustrates a movable object environment, in accordance with various embodiments of the present disclosure.

FIG. 1 illustrates a movable object environment, in accordance with various embodiments of the present disclosure. As shown in FIG. 1, a movable object 118 in a movable object environment 100 can include a carrier 102 and a payload 104. Although the movable object 118 can be depicted as an aircraft, this depiction is not intended to be limiting, and any suitable type of movable object can be used. One of skill in the art would appreciate that any of the embodiments described herein in the context of aircraft systems can be applied to any suitable movable object (e.g., a UAV). In some instances, the payload 104 may be provided on the movable object 118 without requiring the carrier 102.

In accordance with various embodiments of the present disclosure, the movable object 118 may include one or more movement mechanisms 106 (e.g. propulsion mechanisms), a sensing system 108, and a communication system 110.

The movement mechanisms 106 can include one or more of rotors, propellers, blades, engines, motors, wheels, axles, magnets, nozzles, animals, or human beings. For example, the movable object may have one or more propulsion mechanisms. The movement mechanisms 106 may all be of the same type. Alternatively, the movement mechanisms 106 can be different types of movement mechanisms. The movement mechanisms 106 can be mounted on the movable object 118 (or vice-versa), using any suitable means such as a support element (e.g., a drive shaft). The movement mechanisms 106 can be mounted on any suitable portion of the movable object 118, such on the top, bottom, front, back, sides, or suitable combinations thereof.

In some embodiments, the movement mechanisms 106 can enable the movable object 118 to take off vertically from a surface or land vertically on a surface without requiring any horizontal movement of the movable object 118 (e.g., without traveling down a runway). Optionally, the movement mechanisms 106 can be operable to permit the movable object 118 to hover in the air at a specified position and/or orientation. One or more of the movement mechanisms 106 may be controlled independently of the other movement mechanisms. Alternatively, the movement mechanisms 106 can be configured to be controlled simultaneously. For example, the movable object 118 can have multiple horizontally oriented rotors that can provide lift and/or thrust to the movable object. The multiple horizontally oriented rotors can be actuated to provide vertical takeoff, vertical landing, and hovering capabilities to the movable object 118. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 118 (e.g., with respect to up to three degrees of translation and up to three degrees of rotation).

The sensing system 108 can include one or more sensors that may sense the spatial disposition, velocity, and/or acceleration of the movable object 118 (e.g., with respect to various degrees of translation and various degrees of rotation). The one or more sensors can include any of the sensors, including GPS sensors, motion sensors, inertial sensors, proximity sensors, or image sensors. The sensing data provided by the sensing system 108 can be used to control the spatial disposition, velocity, and/or orientation of the movable object 118 (e.g., using a suitable processing unit and/or control module). Alternatively, the sensing system 108 can be used to provide data regarding the environment surrounding the movable object, such as weather conditions, proximity to potential obstacles, location of geographical features, location of manmade structures, and the like.

The communication system 110 enables communication with terminal 112 having a communication system 114 via wireless signals 116. The communication systems 110, 114 may include any number of transmitters, receivers, and/or transceivers suitable for wireless communication. The communication may be one-way communication, such that data can be transmitted in only one direction. For example, one-way communication may involve only the movable object 118 transmitting data to the terminal 112, or vice-versa. The data may be transmitted from one or more transmitters of the communication system 110 to one or more receivers of the communication system 112, or vice-versa. Alternatively, the communication may be two-way communication, such that data can be transmitted in both directions between the movable object 118 and the terminal 112. The two-way communication can involve transmitting data from one or more transmitters of the communication system 110 to one or more receivers of the communication system 114, and vice-versa.

In some embodiments, the terminal 112 can provide control data to one or more of the movable object 118, carrier 102, and payload 104 and receive information from one or more of the movable object 118, carrier 102, and payload 104 (e.g., position and/or motion information of the movable object, carrier or payload; data sensed by the payload such as image data captured by a payload camera; and data generated from image data captured by the payload camera). In some instances, control data from the terminal may include instructions for relative positions, movements, actuations, or controls of the movable object, carrier, and/or payload. For example, the control data may result in a modification of the location and/or orientation of the movable object (e.g., via control of the movement mechanisms 106), or a movement of the payload with respect to the movable object (e.g., via control of the carrier 102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view).

In some instances, the communications from the movable object, carrier and/or payload may include information from one or more sensors (e.g., of the sensing system 108 or of the payload 104) and/or data generated based on the sensing information. The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier, and/or payload. Such information from a payload may include data captured by the payload or a sensed state of the payload. The control data transmitted by the terminal 112 can be configured to control a state of one or more of the movable object 118, carrier 102, or payload 104. Alternatively or in combination, the carrier 102 and payload 104 can also each include a communication module configured to communicate with terminal 112, such that the terminal can communicate with and control each of the movable object 118, carrier 102, and payload 104 independently.

In some embodiments, the movable object 118 can be configured to communicate with another remote device in addition to the terminal 112, or instead of the terminal 112. The terminal 112 may also be configured to communicate with another remote device as well as the movable object 118. For example, the movable object 118 and/or terminal 112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 118, receive data from the movable object 118, transmit data to the terminal 112, and/or receive data from the terminal 112. Optionally, the remote device can be connected to the Internet or other telecommunications network, such that data received from the movable object 118 and/or terminal 112 can be uploaded to a website or server.

FIG. 2 illustrates an exemplary carrier 201 in a movable object environment, in accordance with embodiments. The carrier 201 can be used to couple a payload 202 such as an image capturing device to a movable object such as a UAV.

The carrier 201 can be configured to permit the payload 202 to rotate about one or more axes, such as three axes: X or pitch axis, Z or roll axis, and Y or yaw axis, relative to the movable object. For instance, the carrier 201 may be configured to permit the payload 202 to rotate only around one, two, or three of the axes. The axes may or may not be orthogonal to each other. The range of rotation around any of the axes may or may not be limited and may vary for each of the axes. The axes of rotation may or may not intersect with one another. For example, the orthogonal axes may intersect with one another. They may or may not intersect at a payload 202. Alternatively, they may not intersect.

The carrier 201 can include a frame assembly 211 comprising one or more frame members. For example, a frame member can be configured to be coupled with and support the payload 202 (e.g., image capturing device).

In some embodiments, the carrier 201 can comprise one or more carrier sensors 213 useful for determining a state of the carrier 201 or the payload 202 carried by the carrier 201. The state information may include a spatial disposition (e.g., position, orientation, or attitude), a velocity (e.g., linear or angular velocity), an acceleration (e.g., linear or angular acceleration), and/or other information about the carrier, a component thereof, and/or the payload 202. In some embodiments, the state information as acquired or calculated from the sensor data may be used as feedback data to control the rotation of the components (e.g., frame members) of the carrier. Examples of such carrier sensors may include motion sensors (e.g., accelerometers), rotation sensors (e.g., gyroscope), inertial sensors, and the like.

The carrier sensors 213 may be coupled to any suitable portion or portions of the carrier (e.g., frame members and/or actuator members) and may or may not be movable relative to the UAV. Additionally or alternatively, at least some of the carrier sensors may be coupled directly to the payload 202 carried by the carrier 201.

The carrier sensors 213 may be coupled with some or all of the actuator members of the carrier. For example, three carrier sensors can be respectively coupled to the actuator members 212 for a three-axis carrier and configured to measure the driving of the respective actuator members 212 for the three-axis carrier. Such sensors can include potentiometers or other similar sensors. In an embodiment, a sensor (e.g., potentiometer) can be inserted on a motor shaft of a motor so as to measure the relative position of a motor rotor and motor stator, thereby measuring the relative position of the rotor and stator and generating a position signal representative thereof. In an embodiment, each actuator-coupled sensor is configured to provide a positional signal for the corresponding actuator member that it measures. For example, a first potentiometer can be used to generate a first position signal for the first actuator member, a second potentiometer can be used to generate a second position signal for the second actuator member, and a third potentiometer can be used to generate a third position signal for the third actuator member. In some embodiments, carrier sensors 213 may also be coupled to some or all of the frame members of the carrier. The sensors may be able to convey information about the position and/or orientation of one or more frame members of the carrier and/or the image capturing device. The sensor data may be used to determine position and/or orientation of the image capturing device relative to the movable object and/or a reference frame.

The carrier sensors 213 can provide position and/or orientation data that may be transmitted to one or more controllers (not shown) on the carrier or movable object. The sensor data can be used in a feedback-based control scheme. The control scheme can be used to control the driving of one or more actuator members such as one or more motors. One or more controllers, which may be situated on a carrier or on a movable object carrying the carrier, can generate control signals for driving the actuator members. In some instances, the control signals can be generated based on data received from carrier sensors indicative of the spatial disposition of the carrier or the payload 202 carried by the carrier 201. The carrier sensors may be situated on the carrier or the payload 202, as previously described herein. The control signals produced by the controllers can be received by the different actuator drivers. Based on the control signals, the different actuator drivers may control the driving of the different actuator members, for example, to effect a rotation of one or more components of the carrier. An actuator driver can include hardware and/or software components suitable for controlling the driving of a corresponding actuator member and receiving position signals from a corresponding sensor (e.g., potentiometer). The control signals can be transmitted simultaneously to the actuator drivers to produce simultaneous driving of the actuator members. Alternatively, the control signals can be transmitted sequentially, or to only one of the actuator drivers. Advantageously, the control scheme can be used to provide feedback control for driving actuator members of a carrier, thereby enabling more precise and accurate rotation of the carrier components.

In some instances, the carrier 201 can be coupled indirectly to the UAV via one or more damping elements. The damping elements can be configured to reduce or eliminate movement of the load (e.g., payload, carrier, or both) caused by the movement of the movable object (e.g., UAV). The damping elements can include any element suitable for damping motion of the coupled load, such as an active damping element, a passive damping element, or a hybrid damping element having both active and passive damping characteristics. The motion damped by the damping elements provided herein can include one or more of vibrations, oscillations, shaking, or impacts. Such motions may originate from motions of the movable object that are transmitted to the load. For example, the motion may include vibrations caused by the operation of a propulsion system and/or other components of a UAV.

The damping elements may provide motion damping by isolating the load from the source of unwanted motion by dissipating or reducing the amount of motion transmitted to the load (e.g., vibration isolation). The damping elements may reduce the magnitude (e.g., amplitude) of the motion that would otherwise be experienced by the load. The motion damping applied by the damping elements may be used to stabilize the load, thereby improving the quality of images captured by the load (e.g., image capturing device), as well as reducing the computational complexity of image stitching steps required to generate a panoramic image based on the captured images.

The damping elements described herein can be formed from any suitable material or combination of materials, including solid, liquid, or gaseous materials. The materials used for the damping elements may be compressible and/or deformable. For example, the damping elements can be made of sponge, foam, rubber, gel, and the like. For example, damping elements can include rubber balls that are substantially spherical in shape. The damping elements can be of any suitable shape such as substantially spherical, rectangular, cylindrical, and the like. Alternatively or in addition, the damping elements can include piezoelectric materials or shape memory materials. The damping elements can include one or more mechanical elements, such as springs, pistons, hydraulics, pneumatics, dashpots, shock absorbers, isolators, and the like. The properties of the damping elements can be selected so as to provide a predetermined amount of motion damping. In some instances, the damping elements may have viscoelastic properties. The properties of the damping elements may be isotropic or anisotropic. For instance, the damping elements may provide motion damping equally along all directions of motion. Conversely, the damping element may provide motion damping only along a subset of the directions of motion (e.g., along a single direction of motion). For example, the damping elements may provide damping primarily along the Y (yaw) axis. As such, the illustrated damping elements can be configured to reduce vertical motions.

Although various embodiments may be depicted as utilizing a single type of damping elements (e.g., rubber balls), it shall be understood that any suitable combination of types of damping elements can be used. For example, the carrier may be coupled to the movable object using one or more damping elements of any suitable type or types. The damping elements may have the same or different characteristics or properties such as stiffness, viscoelasticity, and the like. Each damping element can be coupled to a different portion of the load or only to a certain portion of the load. For instance, the damping elements may be located near contact or coupling points or surfaces of between the load and the movable objects. In some instances, the load can be embedded within or enclosed by one or more damping elements.

Figure 3:
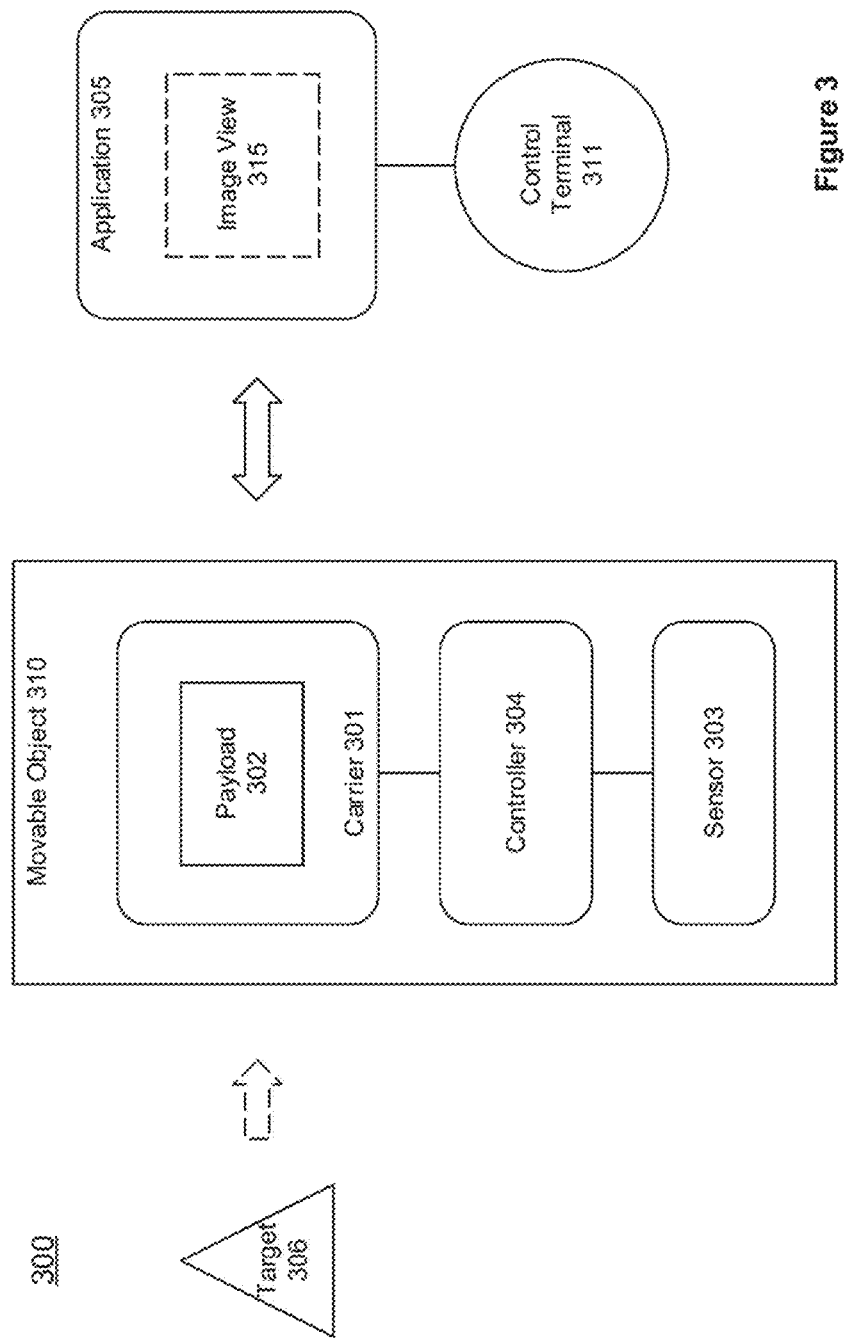
FIG. 3 illustrates supporting target tracking in a movable object environment, in accordance with various embodiments of the present disclosure.

FIG. 3 illustrates supporting target tracking in a movable object environment, in accordance with various embodiments of the present disclosure. As shown in FIG. 3, the target tracking system 300 includes a movable object 310 and a control terminal 311. The system 300 may be used for following, such as tracking, one or more targets 306. Although the movable object 310 is depicted as an unmanned aerial vehicle (UAV), this depiction is not intended to be limiting, and any suitable type of movable object can be used, as described herein. One of skill in the art would appreciate that any of the embodiments described herein in the context of aircraft systems can be applied to any suitable movable object.

In some embodiments, the movable object 310 can include a carrier 301 and a payload 302. The carrier 301 may permit the payload 302 to move relative to the movable object 310. For instance, the carrier 301 (e.g. a gimbal) may permit the payload 302 to rotate around one or more axes. Alternatively or additionally, the carrier 301 may permit the payload 302 to move linearly along one or more axes. The axes for the rotational or translational movement may or may not be orthogonal to each other.

In some embodiments, the payload 302 may be rigidly coupled to or connected with the movable object 310 such that the payload 302 remains substantially stationary relative to the movable object 310. For example, the carrier 301 that connects the movable object 310 and the payload 302 may not permit the payload 301 to move relative to the movable object 310. Alternatively, the payload 302 may be coupled directly to the movable object 310 without requiring a carrier.

In some embodiments, the payload 302 can include one or more sensors for surveying or tracking one or more targets 306. Examples of such a payload may include an image capturing device or imaging device (e.g., camera or camcorder, infrared imaging device, ultraviolet imaging device, or the like), an audio capture device (e.g., a parabolic microphone), an infrared imaging device, or the like. Any suitable sensor(s) can be incorporated into the payload 302 to capture any visual, audio, electromagnetic, or any other desirable signals. The sensors can provide static sensing data (e.g., a photograph) or dynamic sensing data (e.g., a video). The sensors may capture sensing data continuously in real time or at high frequencies.

In various embodiments, the target 306 being tracked by the movable object 310 can include any natural or man-made objects or structures such as geographical landscapes (e.g., mountains, vegetation, valleys, lakes, or rivers), buildings, vehicles (e.g., aircrafts, ships, cars, trucks, buses, vans, or motorcycle). The target 306 can also include live subjects such as people or animals. The target 306 may be moving or stationary relative to any suitable reference frame. The reference frame can be a relatively fixed reference frame (e.g., the surrounding environment, or earth). Alternatively, the reference frame can be a moving reference frame (e.g., a moving vehicle). In various embodiments, the target 306 may include a passive target or an active target. An active target may be configured to transmit information about the target, such as the target's GPS location, to the movable object. Information may be transmitted to the movable object via wireless communication from a communication unit of the active target to a communication unit of the movable object. Examples of an active target can include a friendly vehicle, building, troop, or the like. A passive target is not configured to transmit information about the target. Examples of a passive target can include a neutral or hostile vehicle, building, troop, and the like.

In some embodiments, the control terminal 311 can be configured to provide control data or data that can be used by a controller 304 on board the movable object 310 for generating the control data. The control data can be used for controlling, directly or indirectly, aspects of the movable object 310. In some embodiments, the control data can include navigation commands for controlling navigational parameters of the movable object such as the position, speed, orientation, or attitude of the movable object 310. For example, the control data can be used to control flight of a UAV. The control data may affect operation of one or more propulsion units that may affect the flight of the UAV. In other cases, the control data can include commands for controlling individual components of the movable object 310.

In some embodiments, the control data may include information for controlling the operations of the carrier 301. For example, the control data may be used to control an actuation mechanism of the carrier 301 to cause angular and/or linear movement of the payload 302 relative to the movable object 310. As another example, the control data may be used to control the movement of the carrier 301 without the payload. As another example, the control data may be used to adjust one or more operational parameters for the payload 302 such as taking still or moving pictures, zooming in or out, turning on or off, switching imaging modes, change image resolution, changing focus, changing depth of field, changing exposure time, changing speed of lens, changing viewing angle or field of view, or the like. In other embodiments, the control data may be used to control a sensing system (not show), communication system (not shown), and the like, of the movable object 310.

In some embodiments, the control data from the control terminal 311 can include target information, which can be used by a controller 304 on board the movable object 310 for generating the control data. In some cases, the target information can include characteristics of a specific target such as an initial position (e.g., coordinates) and/or size of a target within one or more images captured by an imaging device carried by the movable object 310. Additionally or alternatively, the target information can include target type information such as characteristics of a type or category of targets including color, texture, pattern, size, shape, dimension, and the like. Target information can include data representation of an image of the target. This may include an image of the target in a field of view. Field of view may be defined or encompassed by the images captured by the imaging device.

Target information can also include expected target information. The expected target information specifies the characteristics that the target being tracked is expected to meet in the images captured by the imaging device. The expected target information may be used to adjust the movable object, carrier and/or imaging device so that the target being tracked maintains an appearance in one or more images according to the expected target information. For example, the target may be tracked so as to maintain an expected position and/or size within one or more images captured by the imaging device. For example, the expected position of the tracked target may be near the center of the image or off-center. The expected size of the tracked target may be around a certain number of pixels. The expected target information may or may not be the same as the initial target information. In various embodiments, expected target information may or may not be provided by the control terminal. For example, expected target information may be hardcoded in the control logic executed by a processing unit onboard the movable object, stored in a data store local and/or remote to the movable object, or obtained from other suitable sources.

In some embodiments, the target information (including specific target information and target type information) may be generated at least in part on user input at the control terminal 311. Additionally or alternatively, the target information may be generated based on data from other sources. For example, target type information may be derived based on previous images and/or data extracted from local or remote data stores. The images could have been previously captured by the imaging device coupled to the movable object 310 or other devices. The images could be computer-generated. Such target type information may be selected by the user and/or provided automatically by default to the movable object.

The target information may be used by the movable object 310 to track one or more targets 306. The tracking and any other related data processing may be performed at least in part by one or more processors onboard the movable object 310. In some embodiments, the target information can be used to identify, by the movable object, the target 306 to be tracked. Such identification of the target may be performed based on the initial target information including the specific characteristics of a particular target (e.g., initial coordinates of the target within an image captured by the movable object), or general characteristics of a type of target (e.g., color and/or texture of the target(s) to be tracked). In some cases, target identification can involve any suitable image recognition and/or matching algorithms. In some embodiments, target identification includes comparing two or more images to determine, extract, and/or match features contained therein.

Once a target is identified, expected target information can be used to detect a deviation from expected characteristics of the target such as expected position and/or size. In some embodiments, current target characteristics or information can be determined based on one or more images captured by the movable object. The current target information can be compared with the expected target information provided by the control terminal to determine the deviation therefrom. A change in position of the target may be detected by comparing coordinates of the target (e.g., the coordinates of a center point of the target) within an image to the coordinates of the expected target position. A change in size of the target may be detected by comparing the size of the area (e.g., in pixels) covered by the target with the expected target size. In some embodiments, a change in size may be detected by detecting an orientation, boundaries, or other characteristics of the target.

Based at least in part on the detected deviation, control signals may be generated (e.g., by one or more processors onboard the movable object) that cause adjustment that substantially corrects the detected deviation. As such, the adjustment may be used to substantially maintain one or more expected target characteristics (e.g., target position and/or size) within the images captured by the movable object. In some embodiments, the adjustment may be performed in substantially real time as the movable object is executing user-provided navigation commands (e.g., hovering or moving) and/or predetermined navigation paths. The adjustment may also be performed in substantially real time as the imaging device is capturing one or more images. In some embodiments, the adjustment may be generated based on other information such as sensing data acquired by one or more sensors onboard the movable object (e.g., proximity sensor, or GPS sensor). For example, position information of the target being tracked may be obtained by a proximity sensor and/or provided by the target itself (e.g., GPS location). Such position information may be used, in addition to the detected deviation, to generate the adjustment.

The adjustment may pertain to the movable object, the carrier, and/or the payload (e.g., imaging device). For example, the adjustment may cause the movable object and/or the payload (e.g., imaging device) to change its position, attitude, orientation, angular and/or linear velocity, angular and/or linear velocity, and the like. The adjustment may cause the carrier to move the payload (e.g., imaging device) relative to the movable object such as around or along one, two, three, or more axes. Furthermore, the adjustment may include adjustment to the zoom, focus, or other operational parameters of the payload (e.g., imaging device) itself (e.g., zoom in/out).

In some embodiments, the adjustment may be generated based at least in part on the type of detected deviation. For example, a deviation from the expected target position may require rotation of the movable object and/or the payload (e.g., via the carrier) around one, two, or three rotational axes. As another example, a deviation from the expected target size may require translational movement of the movable object along a suitable axis and/or changes to the zoom of the imaging device (e.g., zoom in or out).

In various embodiments, the adjustment to substantially correct the deviation from expected target information may be achieved by controlling one or more controllable objects such as the movable object, the carrier, the imaging device, or any combination thereof via control signals. In some embodiments, the controllable objects may be selected to implement an adjustment and the corresponding control signals may be generated based at least in part on the configurations or settings of the controllable objects. For example, an adjustment that involves rotation around two axes (e.g., yaw and pitch) may be achieved solely by corresponding rotation of the movable object around the two axes if the imaging device is rigidly coupled to the movable object and hence not permitted to move relative to the movable object. Such may be the case when the imaging device is directly coupled to the movable object, or when the imaging device is coupled to the movable object via a carrier that does not permit relative movement between the imaging device and the movable object. The same two-axis adjustment may be achieved by combining adjustment to both the movable object and the carrier if the carrier permits the imaging device to rotate around at least one axis relative to the movable object. In this case, the carrier can be controlled to implement the rotation around one or two of the two axes required for the adjustment and the movable object can be controlled to implement the rotation around one or two of the two axes. For example, the carrier may include a one-axis gimbal that allows the imaging device to rotate around one of the two axes required for adjustment while the rotation around the remaining axis is achieved by the movable object. Alternatively, the same two-axis adjustment may be achieved by the carrier alone if the carrier permits the imaging device to rotate around two or more axes relative to the movable object. For instance, the carrier may include a two-axis or three-axis gimbal.

As another example, an adjustment to correct a change in size of the target may be achieved by controlling the zoom in/out of the imaging device (e.g., if the imaging device supports the zoom level required), by controlling the movement of the movable object (e.g., so as to get closer to or farther away from the target), or by a combination of zoom in/out of the imaging device and the movement of the movable object. A processor onboard the movable object may make the determination as to which object or combination of objects to adjust. For example, if the imaging device does not support a zoom level required to maintain the required size of the target within an image, the movable object may be controlled to move instead of or in addition to adjusting the zoom of the imaging device.

In some embodiments, the adjustment may be implemented by taking into account other constraints. For example, in cases where the navigation path of the movable object is predetermined, the adjustment may be implemented by the carrier and/or imaging device without affecting the movement of the movable object. The navigation path of the movable object may be predetermined, for example, if a remote user is actively controlling the navigation of the movable object via a control terminal or if the movable object is navigating (e.g., autonomously or semi-autonomously) according to a pre-stored navigation path.

Examples of other constraints may include maximum and/or minimum limit for rotation angles, angular and/or linear speed, operational parameters, and the like for the movable object, the carrier, and/or the payload (e.g., imaging device). Such maximum and/or minimum threshold values may be used to limit the range of the adjustment. For example, the angular speed of the movable object and/or the imaging device around a certain axis may be capped by a maximum angular speed that is allowed for the movable object, the carrier, and/or the payload (e.g., imaging device). As another example, the linear speed of the movable object and/or the carrier may be capped by a maximum linear speed that is allowed for the movable object, the carrier, and/or the payload (e.g., imaging device). As yet another example, adjustment to the focal length of the imaging device may be limited by the maximum and/or minimum focal length for the particular imaging device. In some embodiments, such limits may be predetermined and depend on the particular configuration of the movable object, the carrier, and/or the payload (e.g., imaging device). In some instances, such configurations may be configurable (e.g., by a manufacturer, administrator, or user).

In some embodiments, the movable object 310 can be configured to provide and the control terminal 311 can be configured to receive data such as sensing data acquired by sensors 303 onboard the movable object 310, and tracking data or information used to indicate characteristics of one or more target tracked by the movable object 310. Examples of sensing data may include image data acquired by an imaging device carried by the movable object 310 or other data acquired by other sensors. For example, real-time or nearly real-time video can be streamed from the movable object 310 and/or the payload 302 (e.g., imaging device) to the control terminal 311. The sensing data may also include data acquired by global positioning system (GPS) sensors, motion sensors, inertial sensors, proximity sensors, or other sensors. Examples of tracking information may include relative or absolute coordinates and/or size of the target within one or more image frames received from the movable object, changes of the target between consecutive image frames, GPS coordinates, or other positional information of the target, and the like. In some embodiments, the tracking information may be used by the control terminal 311 to display the target as being tracked (e.g., via a graphical tracking indicator such as a box around the target). In various embodiments, the data received by the control terminal may include raw data (e.g., raw sensing data as acquired by the sensors) and/or processed data (e.g., tracking information as processed by one or more processors on the movable object).

In some embodiments, the control terminal 311 can be located at a location distant or remote from the movable object 310, carrier 301, and/or payload 302. The control terminal 311 can be disposed on or affixed to a support platform. Alternatively, the control terminal 311 can be a handheld or wearable device. For example, the control terminal 311 can include a smartphone, tablet, laptop, computer, glasses, gloves, helmet, microphone, or suitable combinations thereof. Also, the control terminal 311 can support the running of one or more applications 305 (such as mobile apps), which may include an image view 315.

The control terminal 311 can be configured to display data received from the movable object 310 via a display. The displayed data may include sensing data such as images (e.g., still images and videos) acquired by an imaging device carried by the movable object 310. The displayed data may also include tracking information that is displayed separately from the image data or superimposed on top of the image data. For example, the display may be configured to display the images where the target is indicated or highlighted with a tracking indicator such as a box, circle, or any other geometric shape surrounding the target being tracked. In some embodiments, the images and the tracking indicator are displayed in substantially real-time as the image data and tracking information are received from the movable object and/or as the image data is acquired. In other embodiments, the display may be provided after some delay.

The control terminal 311 can be configured to receive user input via an input device. The input device may include a joystick, keyboard, mouse, stylus, microphone, image or motion sensor, inertial sensor, and the like. Any suitable user input can be used to interact with the terminal, such as manually entered commands, voice control, gesture control, or position control (e.g., via a movement, location or tilt of the terminal). For instance, the control terminal 311 may be configured to allow a user to control a state of the movable object, carrier, payload, or any component thereof by manipulating a joystick, changing an orientation or attitude of the control terminal, interacting with a graphical user interface using a keyboard, mouse, finger, or stylus, or by using any other suitable methods.

The control terminal 311 may also be configured to allow a user to enter target information using any suitable method. In some embodiments, the control terminal 311 may be configured to enable a user to directly select a target from one or more images (e.g., video or snapshot) that is being displayed. For example, the user may select a target by directly touching the screen using a finger or stylus or selection using a mouse or joystick. The user may draw around the target, touch the target in the image, or otherwise select the target. Computer vision or other techniques may be used to determine boundary of target. Otherwise, user input may define the boundary of target. One or more targets may be selected at a time. In some embodiments, the selected target is displayed with a selection indicator to indicate that the user has selected the target for tracking. In some other embodiments, the control terminal may be configured to allow a user to enter or select target type information such as color, texture, shape, dimension, or other characteristics associated with a desired target. For example, the user may type in the target type information, select such information using a graphical user interface, or use any other suitable methods. In some other embodiments, the target information may be obtained from sources other than the user such as a remote or local data store, other computing devices operatively connected to or otherwise in communication with the control terminal, or the like.

In some embodiments, the control terminal allows a user to select between a manual tracking mode and an automatic tracking mode. When the manual tracking mode is selected, a user can specify a specific target to track. For example, the user can manually selects a target from an image being displayed by the control terminal. The specific target information associated with the selected target (e.g., coordinates and/or size) is then provided to the movable object as initial target information of the target. On the other hand, when the automatic tracking mode is selected, the user does not specify a specific target to be tracked. Rather, the user can specify descriptive information about the type of target to be tracked, for example, via a user interface provided by the control terminal. The movable object can then use the initial target information of a specific target or target type information to automatically identify the target to be tracked and subsequently track the identified target.

Here, providing specific target information (e.g., initial target information) requires more user control of the tracking of the target and less automated processing or computation (e.g., image or target recognition) by a processing system onboard the movable object. On the other hand, providing target type information requires less user control of the tracking process but more computation performed by the onboard processing system. The appropriate allocation of the control over the tracking process between the user and the onboard processing system may be adjusted depending on a variety of factors such as the surroundings of the movable object, speed or altitude of the movable object, user preferences, and computing resources (e.g., CPU or memory) available onboard and/or off-board the movable object, the like. For example, relatively more control may be allocated to the user when the movable object is navigating in a relatively complex environment (e.g., with numerous buildings or obstacles or indoor) than when the movable object is navigating in a relatively simple environment (e.g., wide open space or outdoor). As another example, more control may be allocated to the user when the movable object is at a lower altitude than when the movable object is at a higher altitude. As yet another example, more control may be allocated to the movable object if the movable object is equipped with a high-speed processor adapted to perform complex computations relatively quickly. In some embodiments, the allocation of control over the tracking process between user and movable object may be dynamically adjusted based on the factors described herein.

The user input may be used, at least in part, to generate control data such as described herein. The control data may be generated by the control terminal, the movable object, a third device, or any combination thereof. For instance, the user's manipulation of a joystick or the control terminal or an interaction with a graphical user interface may be translated into predetermined control commands for changing a state or parameter of the movable object, carrier, or payload. As another example, a user's selection of a target within an image being displayed by the control terminal may be used to generate initial and/or expected target information for tracking purposes such as an initial and/or expected position and/or size of the target. Alternatively or additionally, the control data may be generated based on information obtained from non-user sources such as a remote or local data store, other computing devices operatively connected to the control terminal, or the like.

Figure 4:
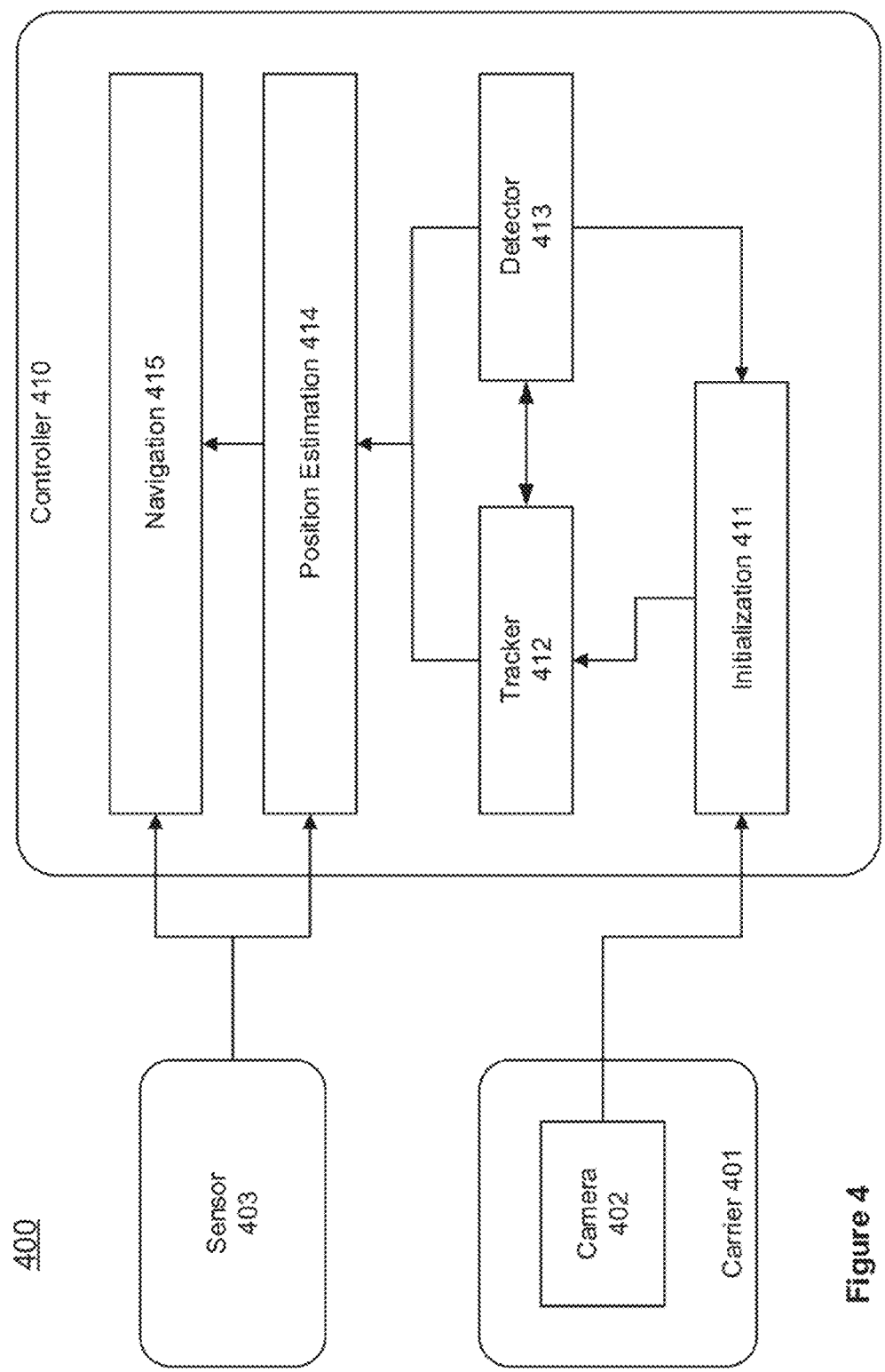
FIG. 4 illustrates an exemplary target tracking system in a movable object environment, in accordance with various embodiments of the present disclosure.

FIG. 4 illustrates an exemplary target tracking system in a movable object environment, in accordance with various embodiments of the present disclosure. As shown in FIG. 4, a movable object 400 includes a controller 410, which can receive various types of information, such as imagery information, from a camera 402, which is carried by a carrier 401, and other sensors 403 on board.

The controller 410 can perform an initialization operation 411 based on the imagery information received from the camera 402. Optionally, the controller 410 can use a specialized or general detector 413 for detecting the target (i.e. the object to be tracked) in an initialization image. Thus, the controller 410 can acquire the target and set up corresponding tracking strategies.

Furthermore, the movable object 400 can use a tracker 412 for tracking the target. In the case when the tracker 412 losses the target, the system can use the detector 413 for redetecting the lost target to continue the tracking process. Additionally, the controller 410 can perform further operations, such as position estimation 414 and navigation operations 415, based on the information received from the sensor 403.

Figure 5:
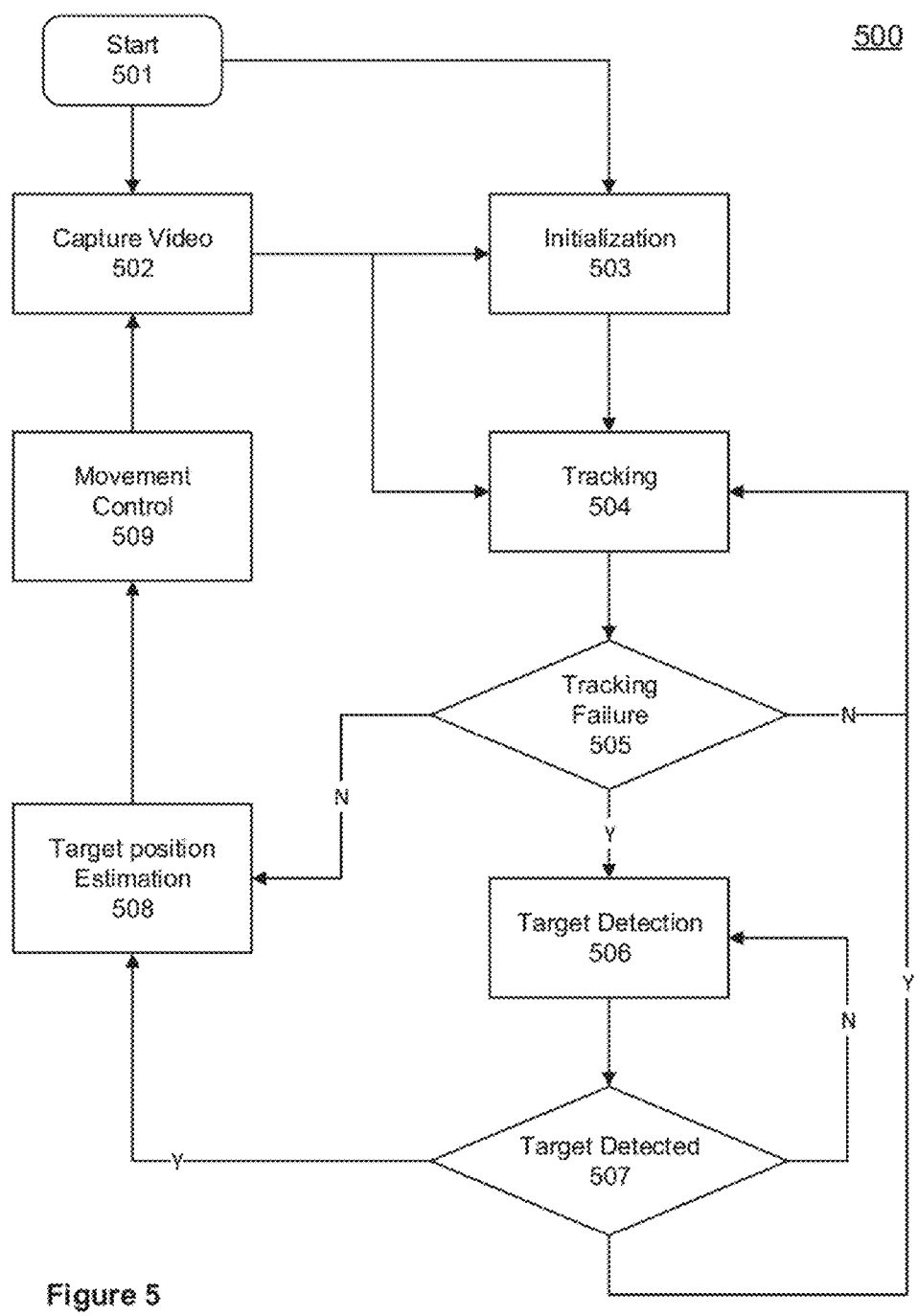
FIG. 5 illustrates supporting target tracking in a movable object environment, in accordance with various embodiments of the present disclosure.

FIG. 5 illustrates supporting target tracking in a movable object environment 500, in accordance with various embodiments of the present disclosure.

At step 501, a movable object may start tracking a target. At step 502, the movable object can capture one or more images, such as videos, in real time. For example, the movable object can take advantage of the camera carried by a gimbal or other image sensors on board of the movable object (such as a UAV).

At step 503, the movable object can perform the initialization operation for acquiring a target. For example, the movable object can acquire a target from an initialization image and obtain a feature model for the target. Furthermore, the movable object may continually perform the initialization operation until the target has been successfully acquired.

At step 504, the movable object can perform the tracking process. For example, the movable object can employ a vision-based tracker for tracking the target.

At step 505, the system can check whether a tracking failure occurs. At step 506, when a tracking failure occurs, the system can perform the target detection operation. Then, at step 507 the system can check whether the target is detected. The system can repeatedly perform the target detection operation until the target is redetected.

On the other hand, at step 508, the system can estimate the target position for continuously tracking the target as long as the tracking is successful (i.e. including the cases when the target is redetected). At step 509, with the aid of the estimated target position, the system can perform the movement control operation, such as flight control for a UAV, which allows the moveable object to capture the images for continuously tracking.

Figure 6:
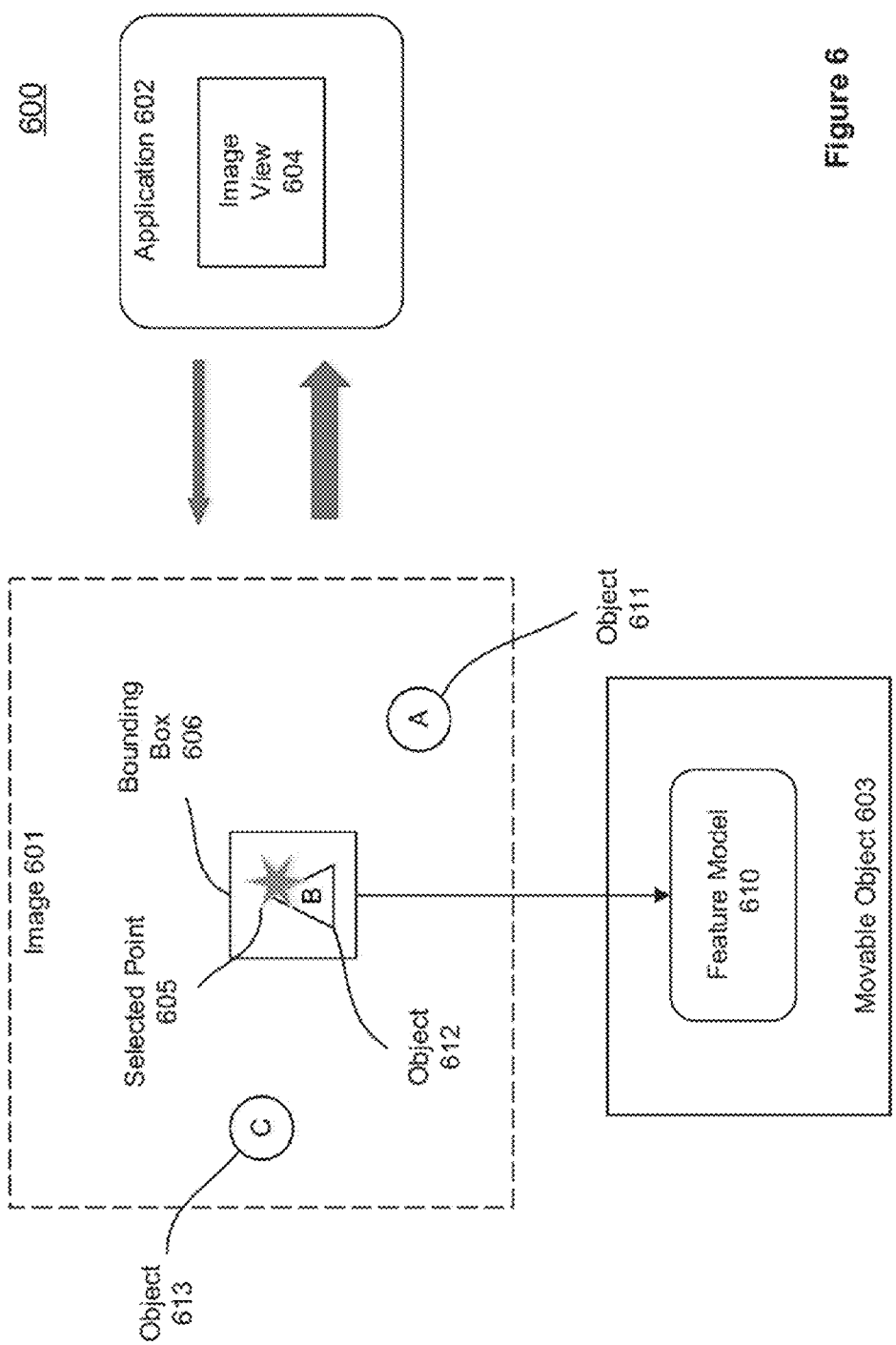
FIG. 6 illustrates initializing target tracking in a movable object environment, in accordance with various embodiments of the present disclosure.

FIG. 6 illustrates initializing target tracking in a movable object environment 600, in accordance with various embodiments of the present disclosure. As shown in FIG. 6, a movable object 603 can capture an image 601, which can be transmitted to an application 602 (e.g. on a ground terminal). The application 602 can use an image view 604 for displaying the image 601, which includes one or more features, e.g. the objects A-C 611-613.

In accordance with various embodiments of the present disclosure, the movable object 603 can use different types of object detector for detecting the target (i.e. the object that is desired by the user), e.g. after receiving a user input such as a point on a target and/or a target class to be tracked (e.g. a human being).

For example, the movable object 603 can use an object proposal approach at the initialization stage. As shown in FIG. 6, the system allows a user to select a point 605 on an interested object, e.g. the object B 612 in the image 601. Once receiving the selected point 605 from the user, the system can use a bounding box 606 for defining and proposing the object 612, which may have irregular shapes.

Furthermore, the system may propose multiple object candidates, e.g. using different bounding boxes. In such a case, the user is allowed to make a decision on which object candidate (i.e. bounding box) is desired. Then, the system can generate a feature model 610 based on the selected object proposal. As shown in FIG. 6, the feature model 610 can represent the imagery characteristics of the patch of image points within the bounding box 606. After receiving the selection of the desired object candidate (or bounding box) from the ground station, the movable object 603 can start tracking the target based on the feature model 610 for the target.

In accordance with various embodiments of the present disclosure, the feature model 610 can be constructed based on examining common objects such as human body, cars, and human faces. In such a case, the feature model 610 can include various discrete objects that are trained offline. Alternatively, the feature model 610 can be constructed based on analyzing characteristics of the objects, such as the edge/contour and color information. For example, the feature model 610 can be generated using different methods, such as optical flow and/or correlation filter algorithms. Also, the feature model 610 may be represented in the spatial domain and/or the frequency domain.

Using such an initialization process, the data to be transmitted from a ground station (i.e. the application 602) to the movable object 603 (e.g. a UAV) is limited, since only the position of the selected point 605 may be needed for initializing the tracking process. Thus, the transmission delay in the initialization step can be minimized. On the other hand, the movable object can continuously transmit image or video data to the application 602 for user interaction, since the data link from the movable object 603 (e.g. a UAV) to the ground station (i.e. the application 602) often have a wider bandwidth and a higher speed than the data link from the movable object 603 to the ground station (i.e. the application 602).

Figure 7:
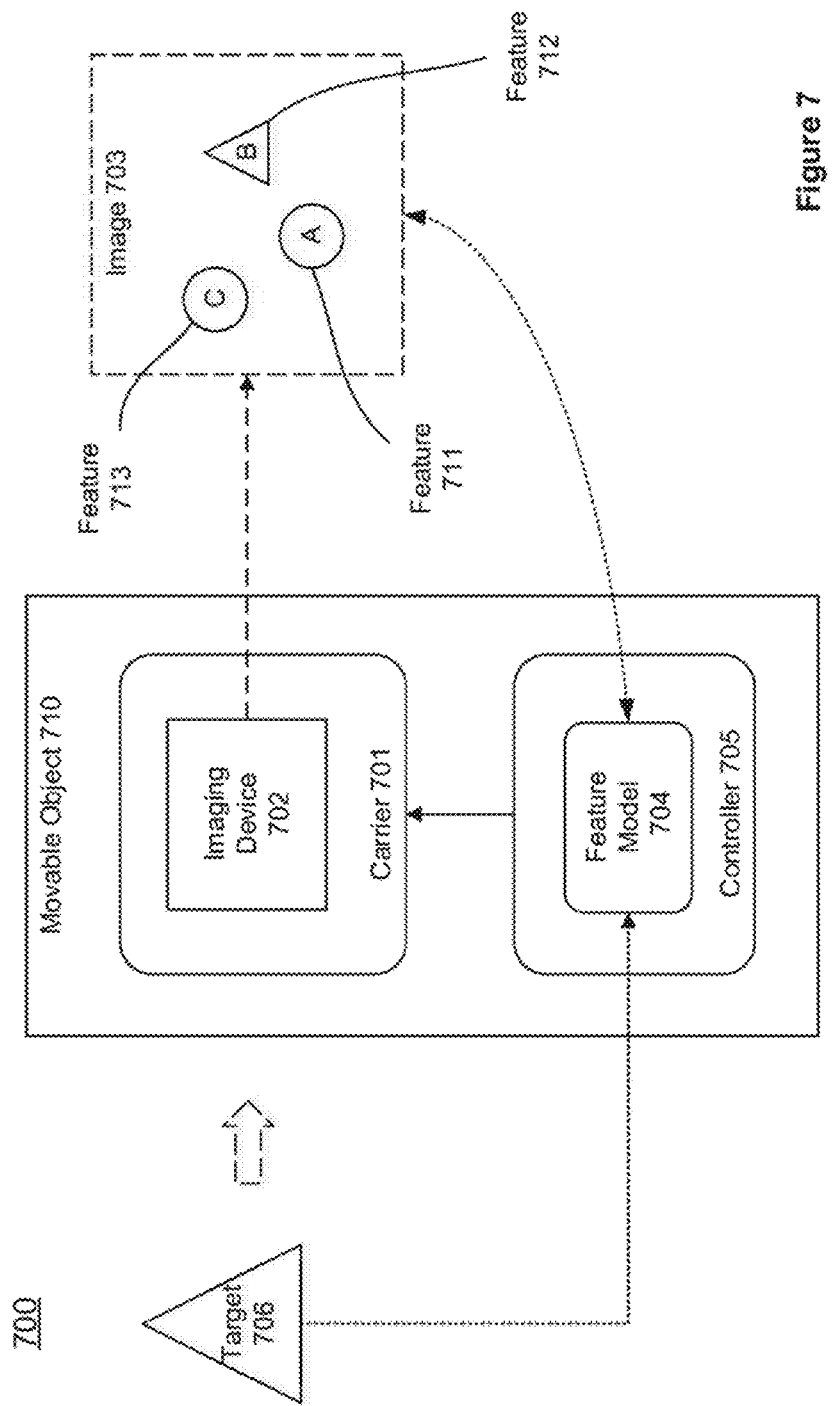
FIG. 7 illustrates tracking a target in a movable object environment, in accordance with various embodiments of the present disclosure.

FIG. 7 illustrates tracking a target in a movable object environment 700, in accordance with various embodiments of the present disclosure. As shown in FIG. 7, a movable object 710 can include a carrier 701, which carries an imaging device 702 such as a camera. The imaging device 702 can capture an image 703 for the target 706. Furthermore, the movable object 710 can include a controller 705, which can maintain a feature model 704 for tracking the target 706 and generates control signals for controlling the movable object 710.

In accordance with various embodiments of the present disclosure, the system can track a target by following a feature that represents the target 706. For example, the system can determine the similarity between the various features, such as features A-C 711-713 in the image 703, and the feature model 704. The similarity may be calculated as a result value (or score) of a function for each feature in the image 703. Based on the calculated score, the system can determine which feature represents the target 706. Alternatively, the system can directly compare each feature in the image 703 with the feature model to determine whether the feature represents the target 706.

Periodically, the system can determine whether the similarity between the feature and the feature model remains within a tracking process, e.g. by checking whether the result value (or score) of the function remains above a previously determined threshold. The system may consider the target is lost, when the value is below the previously determined threshold. Then, the system can examine every subsequent image and looks for the target. The examination can be based on the original feature model or the last updated feature model, and may be performed by traversing different scales and locations in every subsequent images.

Thus, the system can maintain the tracking accuracy, which is beneficial for long term target tracking since small errors may accumulate and make the whole tracking system unstable. Also, the system can perform failure-detection and target re-detection, which also benefits long term target tracking both in terms of robustness and practicability. For example, the system can maintain the tracking of a target, once the target re-appears after being occluded for a while.

Figure 8:
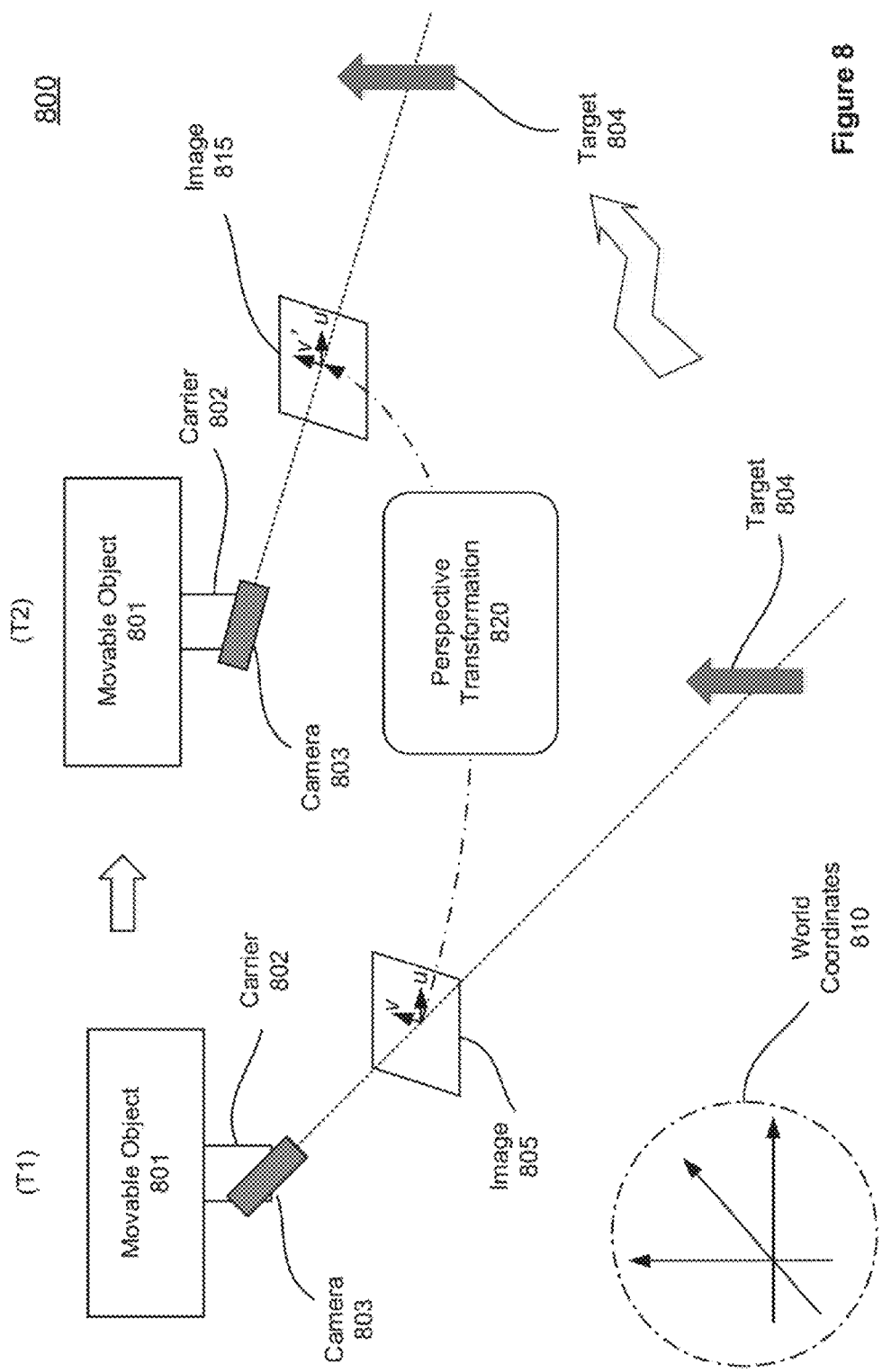
FIG. 8 illustrates a perspective transform relationship between two images that are captured for tracking a target in a movable object environment, in accordance with various embodiments of the present disclosure.

FIG. 8 illustrates a perspective transform relationship between two images that are captured for tracking a target in a movable object environment, in accordance with various embodiments of the present disclosure.

In the example as shown in FIG. 8, a movable object 801 in a movable object environment 800 includes a carrier 802, which carries an imaging device such as a camera 803. The movable object 801 can track a target 804 while the target 804 is moving (or remaining static).

For illustration purpose only, at the time T1, the camera 803 can capture an image 805, in an image plane with a coordinate x-y, for the target 804. Then, at the time T2, the camera 803 can capture an image 815, in an image plane with a coordinate x'-y', for the target 804 (may or may not be at the same location).

As shown in FIG. 8, there can exist a perspective transformation 820 relationship between the image coordinate x-y in the image 805 and the image coordinate x'-y' in the image 815. Such perspective transformation 820 is determined by the change of the relative position between the camera 893 and the target 804.

Figure 9:
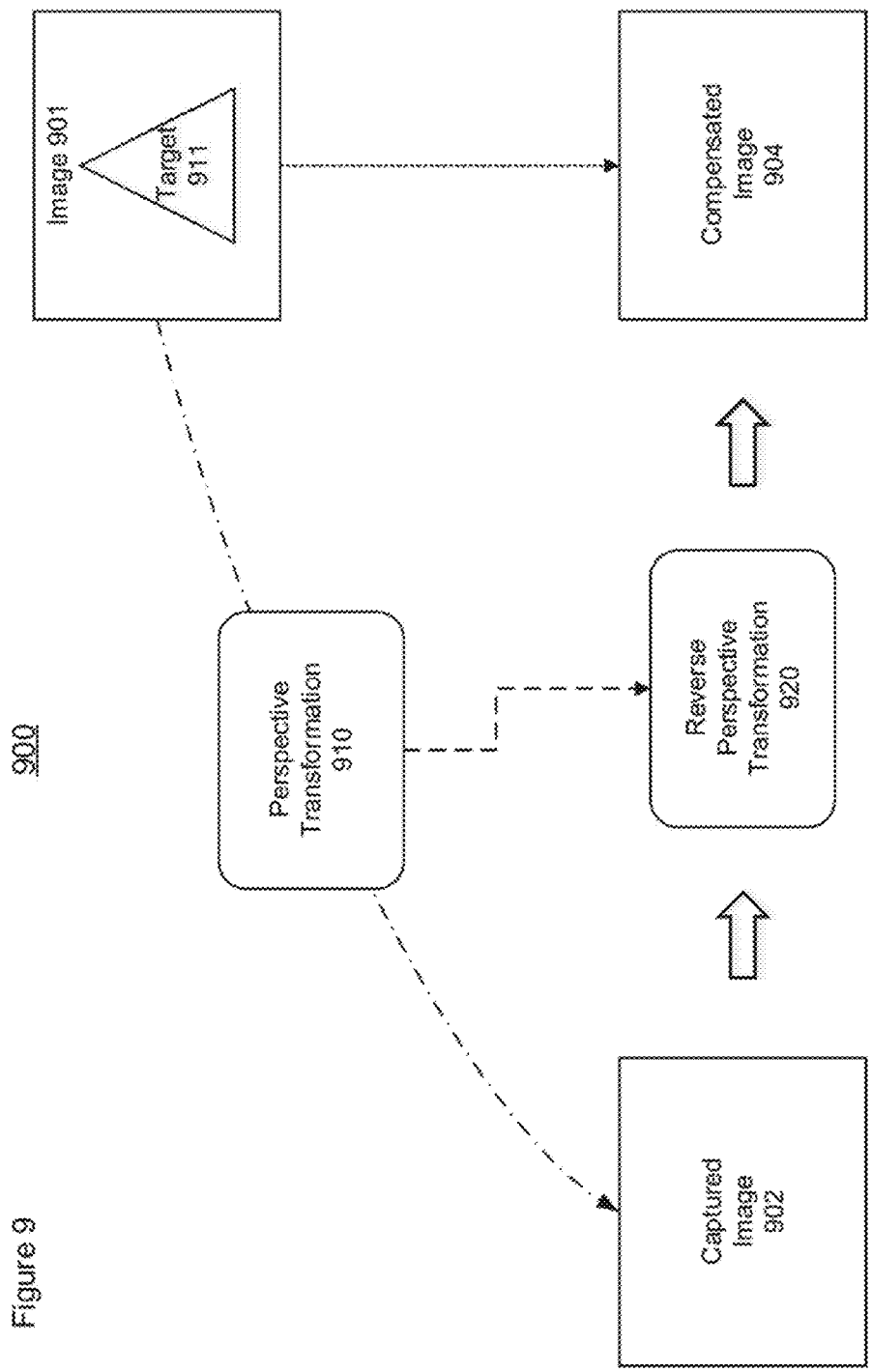
FIG. 9 illustrates using a reverse perspective transformation for supporting tracking in a movable object environment, in accordance with various embodiments of the present disclosure.

FIG. 9 illustrates using a reverse perspective transformation for supporting tracking in a movable object environment 900, in accordance with various embodiments of the present disclosure. As shown in FIG. 9, a perspective transformation 910 may exist between an image 901, which may be an initial image, and an image 902, which is captured at a later time. The perspective projection 910 may alter the geometry of the target 911 as it appears in the image 902, which may increase the difficulty for applying various image based tracking algorithms.

In accordance with various embodiments of the present disclosure, a stabilization mechanism, such as a gimbal, can stabilize the imaging process as the UAV moves. Such stabilization mechanism can alleviate the impact of the camera movement on the performance of tracking. However, the vision based tracking algorithms, such as the gradient feature based histogram of oriented gradients (HOG) method, may still require complex model for handling the change in top views, especially for the object appearing at the edges of the image.

In accordance with various embodiments of the present disclosure, the system can compensate for the perspective transformation between the image 901 and the image 902, which are captured for tracking a target. For example, the system can apply a reverse perspective transformation 920 on the captured image 902 for generating a compensated image 904. The system can obtain the reverse perspective transformation 920 based on the perspective transformation 910.

Then, the system can perform the tracking of the target by applying the feature model on the compensated image 904. Here, the tracking information obtained from the compensated image 904 (such as the bounding box) can be converted back for the captured image 902, which is displayed to the user in an image view on the control terminal. Here, the conversion can be performed using the perspective transformation 910.

Alternatively, the system can apply the reverse perspective transformation 920 on the feature model, before applying the compensated feature model on the captured image 902.

As shown in FIG. 9, image correlation can be achieved by applying a perspective transformation, which accounts for the change in the pitch angle of the camera. Given the pitch angle α and camera intrinsic matrix K, the perspective matrix can be calculated as $$trans = K \times R \times K^{-1}$$

where R is the rotation matrix, $$R = \begin{bmatrix} 1 & 0 & 0 \\ 0 & \cos(\alpha) & -\sin(\alpha) \\ 0 & \sin(\alpha) & \cos(\alpha) \end{bmatrix}$$

and K is the intrinsic matrix, $$K = \begin{bmatrix} f_x & 0 & cx \\ 0 & f_y & cy \\ 0 & 0 & 1 \end{bmatrix}$$

Figure 10:
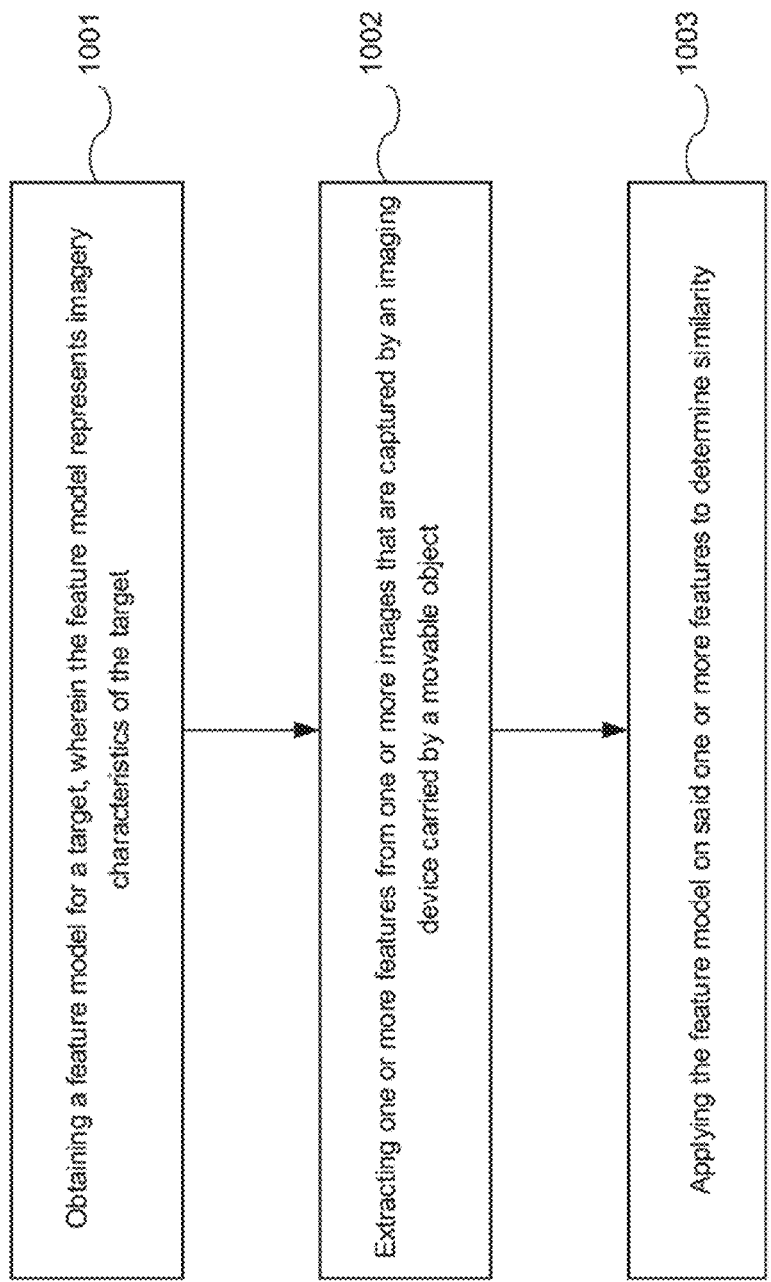
FIG. 10 shows a flowchart of tracking a target in a movable object environment, in accordance with various embodiments of the present disclosure.
Figure 11:
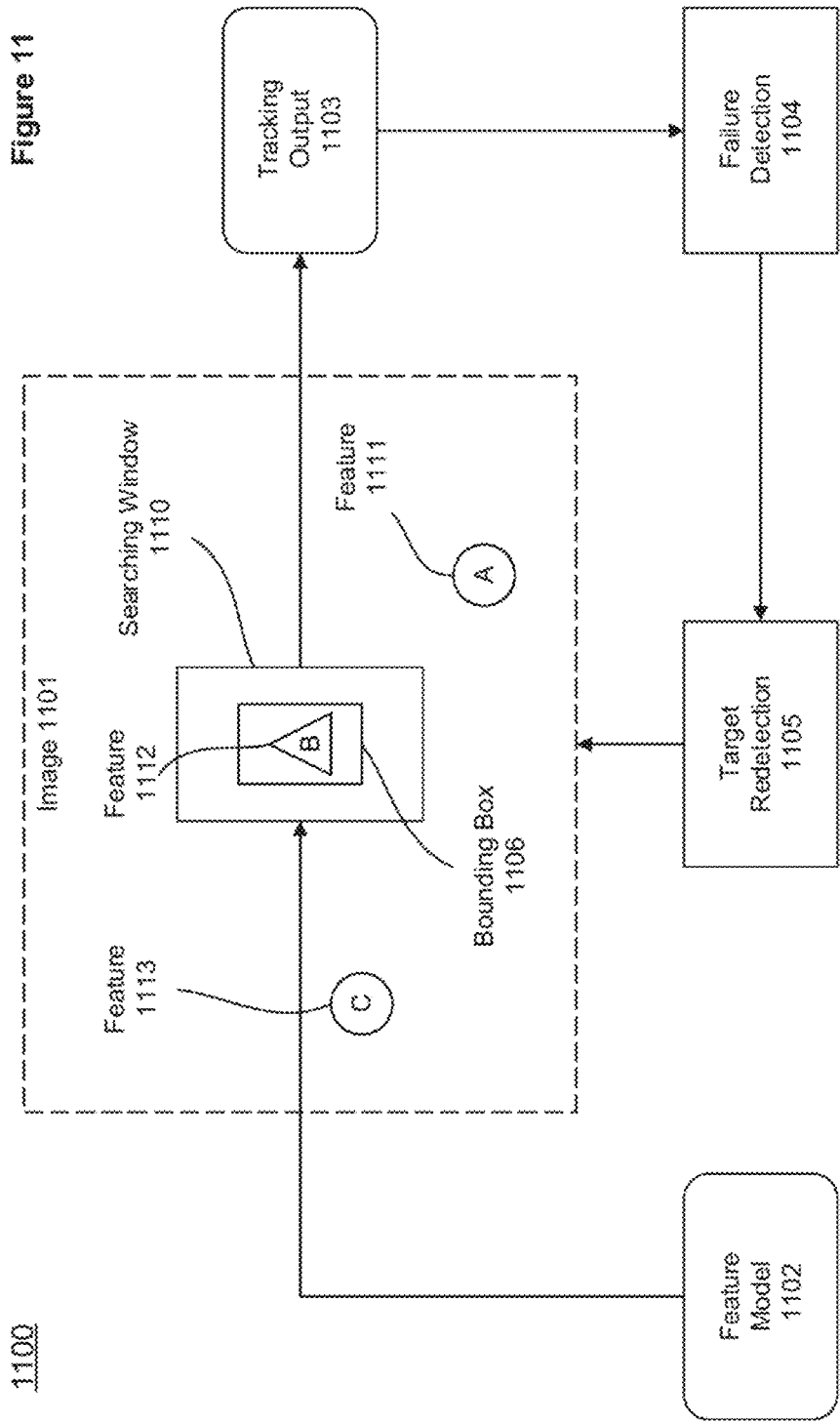
FIG. 11 illustrates supporting target tracking and redetecting in a movable object environment, in accordance with various embodiments of the present disclosure.

FIG. 10 shows a flowchart of tracking a target in a movable object environment, in accordance with various embodiments of the present disclosure. As shown in FIG. 10, at step 1001, the system can obtain a feature model for a target, wherein the feature model represents imagery characteristics of the target. Furthermore, at step 1002, the system can extract one or more features from one or more images that are captured by an imaging device carried by a movable object. Additionally, at step 1003, the system can apply the feature model on said one or more features to determine similarity FIG. 11 illustrates supporting target tracking and redetecting in a movable object environment 1100, in accordance with various embodiments of the present disclosure. As shown in FIG. 11, the system can use a vision based tracker for performing target tracking based on a captured image 1101.

In accordance with various embodiments of the present disclosure, the vision based tracker can take advantage of different tracking algorithms, such as the optical flow algorithms and/or the correlation filter algorithms. Furthermore, the system can automatically track and detect a target over a long period of time. Additionally, the tracking can be performed by taking advantage of a search window that is a local search range, within which the tracking algorithm can find an optimal position/scale of the target, i.e. the tracking can be performed locally instead of globally for the whole image.

As shown in FIG. 11, a vision based tracker can generate a tracking output 1103 by applying a feature model 1102 on the image 1101, which includes various features such as features A-C 1111-1113, while tracking a target. For example, the tracker can follow the feature B with a bounding box 1106 in the searching window 1110. Furthermore, based on the tracking output 1103, the system can perform failure detection 1104 and target redetection 1105 operations.

The tracking output 1103 can be a feature response map, which is generated for the searching window 1110 in the image 1101. Each point in the feature response map can represent a correlation, or similarity, between one or more features extracted from a patch of image points (i.e. a sliding window) in the searching window 1110 and a feature model 1102 for the target.

For example, the system can move a sliding window around in the searching window 1110 to obtain the whole feature response map in the spatial domain. Alternatively, the system can obtain the feature response map in the frequency domain, e.g. using correlation filter method, without a need for actually moving the sliding window all over the searching window 1110 in the image 1101.

For example, the system can incorporate the target detection with the correlation framework, by taking advantage of both a correlation filter based tracking algorithm and a fast object proposal algorithm. The correlation-based object tracking algorithm is fast and effective, which is beneficial for a movable object such as an unmanned aerial vehicle (UAV) since the movable object often has limited computing capability and power resource. Additionally, the system can redetect the target once the target is lost. Also, the system can calculate the position of tracking object on the fly using a single camera, e.g. estimating the object size using the correlation filter based tracking algorithm, with continuity and stability.

Using the correlation framework, the target tracking, which can be performed in the spatial domain and/or the frequency domain, may involve multiple steps, such as a translation estimation step and a scale estimation step. Both steps can include extracting features from an image patch, calculating maximum feature response, and updating the feature model.

For example, the system can perform the translation estimation for the target in the frequency domain based on a rectangular image patch x with M×N pixels, from which a d-dimensional feature map f can be extracted. In order to calculate the maximum feature response, the objective is to find an optimal correlation filter h by minimizing the following cost function:

$$h = \operatorname{argmin}_h \left\| \sum_{l=1}^{d} h^l * f^l - g \right\|^2 + \lambda \sum_{l=1}^{d} \|h^l\|^2$$

where the symbol * denotes the circular correlation, d is the number of total feature dimensions, $f^l$ is the l feature dimension of f, g is the desired correlation output, which can be an Gaussian function, and $\lambda$ is a regularization parameter with $\lambda \geq 0$.

Additionally, the feature model can be updated based on the solution for the above optimization problem. For example, Using the fast Fourier transform (FFT), the solution the above optimization problem is:

$$H^l = \frac{\overline{G} F^l}{\sum_{k=1}^{d} \overline{F^k} F^k + \lambda}$$

where the bar $\overline{G}$, $\overline{F^k}$ denotes complex conjugation and $\overline{G} F^l$, $\overline{F^k} F^k$ is element-wise product.

Furthermore, the system can perform the scale estimation by constructing a target feature pyramid in the estimated translation location in order to handle the object scale variation. Then, the system can find the optimal object scale, which maximizes the scale response. For example, for each scale, $$s \in \left\{ a^n \mid n = \left[ -\frac{N-1}{2} \right], \left[ -\frac{N-2}{2} \right], \ldots, \left[ \frac{N-1}{2} \right] \right\}$$

where N is the number of scales, the system can extract an image patch $z_s$ with a size sP×sQ, which is centered at the estimated translation location. Also, for each patch $z_s$, the system can extract a d'-dimensional feature map f' from the image patch $z_s$ and conjunct f' into a conjunction structure as one separate dimensional. Then, the system can calculate the scale response and update the scale model based on the conjunction structure.

Furthermore, for performing failure detection 1104 operation, the system can quantify the correlation in the feature response map via an indicator, which indicates when the vision-based tracker fails to track the target. For example, the indicator can be based on a peak to sidelobe (PSR) ratio, which can quantify the response map of correlation. The tracker can check the translation response in every frame. When the PSR value is lower than a threshold, $\tau_t$, for a number of images (e.g., 10 frames in a row), the tracker may stop updating the feature model and can trigger the detector to detect the target. For example, the tracker can pass the current translation model $H_t$ to the detector.

Then, for performing target redetection 1105 operation, a detector can undertake the task for detecting (or redetecting) the target, which may include the steps such as generating object proposal for the current image frame, filtering object proposal, obtaining an optimal object candidate, and calculating the confidence for the optimal object candidate.

For example, the system can obtain a set of object proposal candidates for the target in the image frame by using various object proposal algorithms, which allows for avoiding searching the whole image for finding object candidates. Here, the object proposal algorithm may return a large number of object candidates from a single image. Each object candidate can be defined as a rectangular bounding box containing an "object" and can be associated with a corresponding object confidence (e.g. a score). For example, an object proposal can be defined as bb=[x, y, w, h, score], where x, y denote the candidate top-left point position in the image and w, h denote the bounding box width and height respectively. Additionally the object candidate proposals can be ranked in a descending (or ascending) order according to the score.

Then, the system can eliminate unlikely candidates from the set of object proposal candidates. For example, the system can take advantage of a pre-filter process for speeding up the elimination process and for avoiding mismatches, since the object proposal algorithm may return a large number of candidates including candidates that are almost impossible to be the desired object. For example, the system may select only a few (e.g. 10) top candidates after applying the pre-filtering process.

In accordance with various embodiments of the present disclosure, different types of filters can be used in the pre-filter process. For example, the system can first compare the aspect ratio of the candidates with the aspect ratio of the initial object bounding box. A candidate may be filtered out if the aspect ratio is out of a certain range. Also, the system can use color attribute for ranking the remaining candidates. For example, the system can calculate the color attributes in the current image frame. For every candidate, the system can crop a corresponding patch and calculate a color histogram for the patch. Then, the system can rank the candidates by the histogram distance in descending order and select the top candidates. Here, the histogram distance can be defined as the L2-norm distance between the original patch and each candidate.

Furthermore, the system can obtain an optimal object proposal, e.g. by calculating the correlation in spatial domain. For each selected proposal candidate, given a translation model $H_t$ in the frequency domain, the system can get the spatial domain translation model $h_t$ by applying an inverse FFT on the translation model $H_t$ and stacking it up as one dimension in a model. The resulted model in the spatial domain, which may be referred to as the kernel h, can be defined as.

$$h = \sum_{k=1}^{d} \mathcal{F}^{-1}(H_t)$$

Similarly, for the i-th proposal among the top candidates, the system can crop a corresponding patch $z^i$ from the current image frame, extract the feature map from the image patch $z^i$ and then stack it up as one dimension in a feature map. The resulting feature map can be denoted as $f_t^i$.

Then, the spatial correlation response $y_t^i$ is a element wise dot product between h and $f_t^i$, i.e.

$$y_t^i = h \odot f_t^i$$

where $\odot$ is an element-wise dot product operation. Here, the system can select a proposal at the proposal center as the optimal proposal. Thus, the system can speed up the process for obtaining the optimal proposal, since there is no need for searching through all proposals.

Additionally, the system can calculate the confidence for the selected optimal proposal for determining whether the optimal candidate proposal is the "real" target. For example, the system can crop an image patch from the current image frame for the optimal proposal, extract features from the image patch, generate a feature response map and compute the PSR for the feature response map. If the resulting PSR is beyond the threshold, $\tau_t$, the system can determine that the "real" target is detected and the detector may stop from searching further. In such a case, the optimal proposal can be passed to the tracker for continually updating the feature model.

Figure 12:
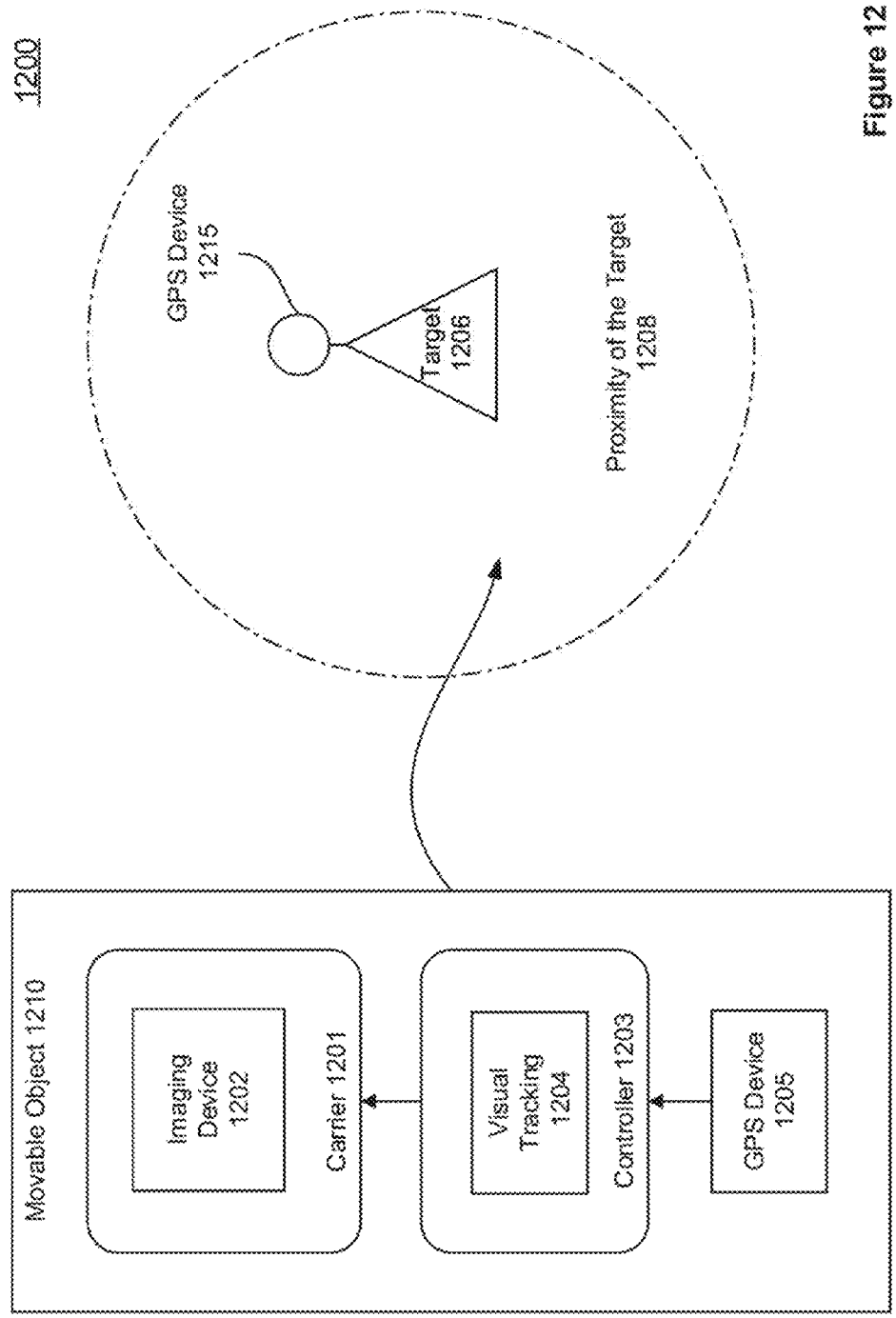
FIG. 12 illustrates using positioning devices for aiding target tracking in a movable object environment, in accordance with various embodiments of the present disclosure.

FIG. 12 illustrates using positioning devices for aiding target tracking in a movable object environment, in accordance with various embodiments of the present disclosure. As shown in FIG. 12, a movable object 1210 in a movable object environment 1200 can include a carrier 1201, which carries an imaging device such as a camera 1202.

Furthermore, the movable object 1210 can include a positioning device, such as a GPS device 1205. Also, the target 1206 may carry a positioning device, such as a GPS device 1215. For example, the target 1206 can be a person who carries a mobile device with GPS functionality, such as a watch, a band, a hat, and/or a pair of shoes.

In real time, the movable object 1210 (e.g. the controller 1203) can obtain the relative distance and orientation of the target 1206, in order to maintain the target within a proximity 1208 of the target (e.g. a predefined circular range). Furthermore, the system may rely on the positioning devices for maintaining the target 1206 within a proximity 1208 of the target when the system determines that the target is lost.

Additionally, the system, e.g. a controller 1203, can use the vision based tracking system 1204, which can be used for the indoor scenes when the GPS signal is not available. Thus, the system can take advantage of both the vision based tacking technologies and the positioning devices for performing a long term tracking task.

Figure 13:
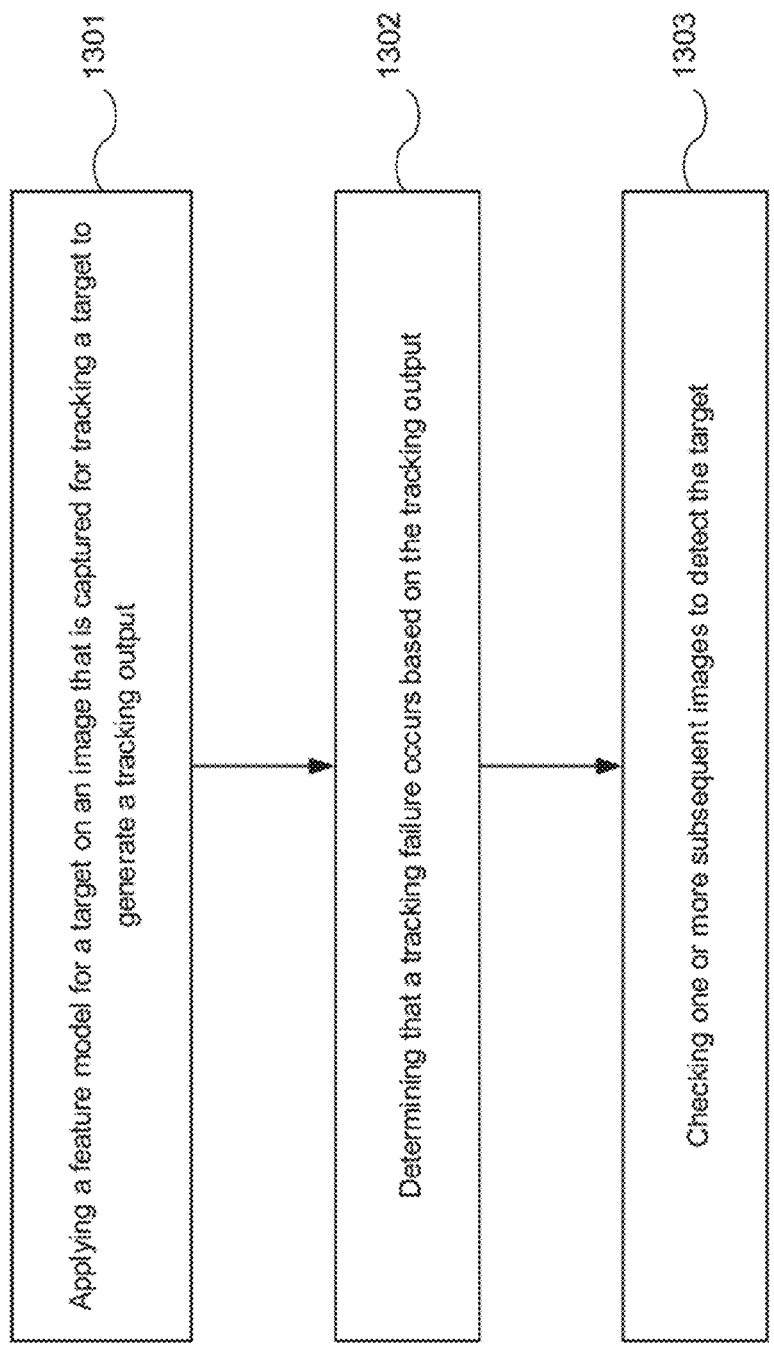
FIG. 13 shows a flowchart of supporting target tracking and redetecting in a movable object environment, in accordance with various embodiments of the present disclosure.

FIG. 13 shows a flowchart of supporting target tracking and redetecting in a movable object environment, in accordance with various embodiments of the present disclosure. As shown in FIG. 13, at step 1301, the system can apply a feature model for a target on an image that is captured for tracking a target to generate a tracking output. Furthermore, at step 1302, the system can determine that a tracking failure occurs based on the tracking output. Additionally, at step 1303, the system can check one or more subsequent images to detect the target.

Figure 14:
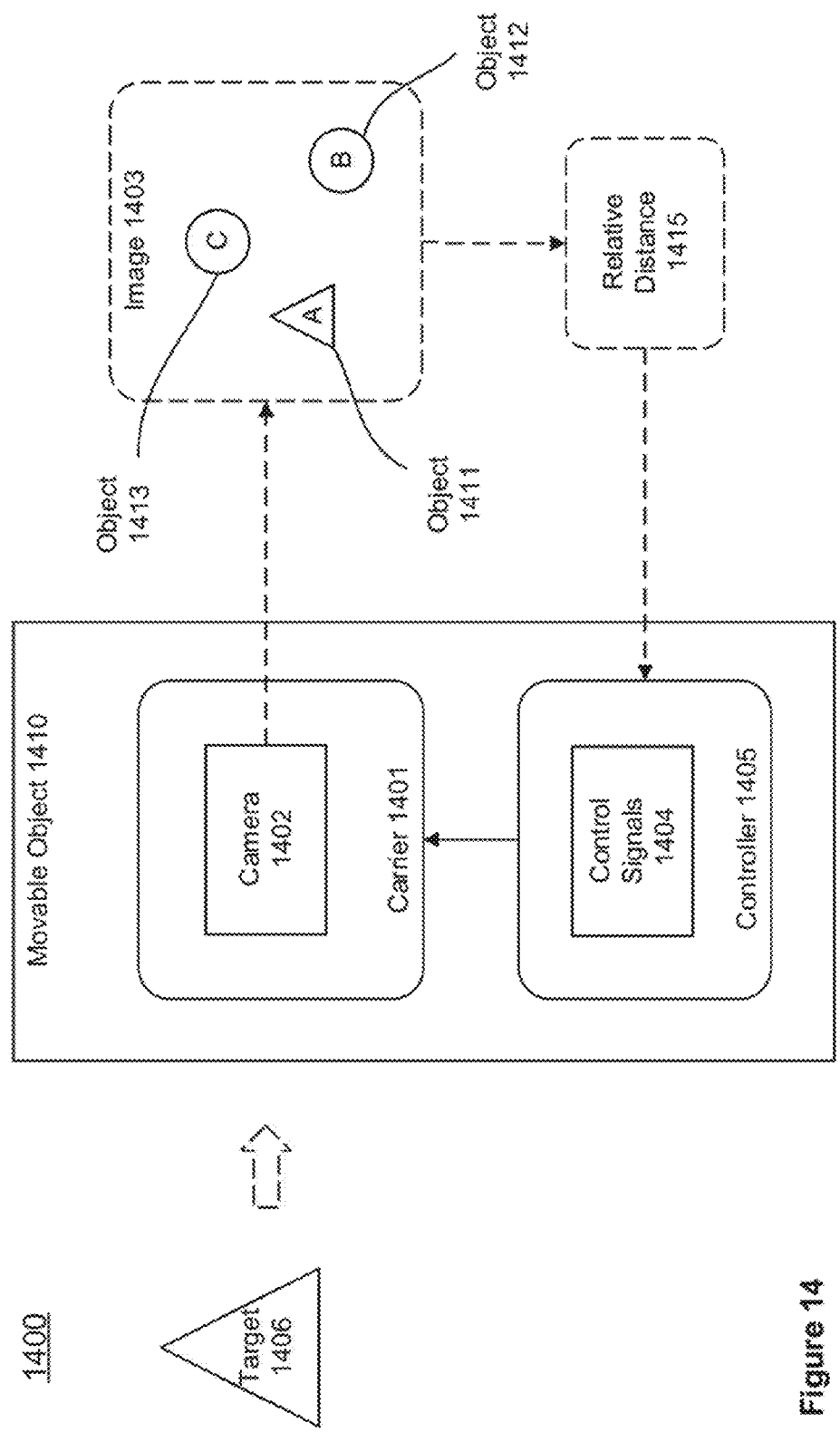
FIG. 14 illustrates tracking a target based on distance measuring in a movable object environment, in accordance with various embodiments of the present disclosure.

FIG. 14 illustrates tracking a target based on distance measuring in a movable object environment, in accordance with various embodiments of the present disclosure. As shown in FIG. 14, a movable object 1410 in a movable object environment 1400 can include a carrier 1401, which carries an imaging device such as a camera 1402.

The movable object 1401 can acquire a target 1406 from an image 1403, which are captured by the camera 1402. For example, the image 1403 may include multiple features, such as objects A-C 1411-1413, and a user can select the object 1411 as the target to follow (or track).

In accordance with various embodiments of the present disclosure, the system can obtain the (3D) position of the target from the (2D) tracking information. For example, the position of the target 1406, which is important for tracking the target, can be determined based on the direction toward the target 1406 and the relative distance 1415 between the movable object 1410 (e.g. a UAV) and the target 1406. The direction of the object can be obtained by calculating the direction vector from a calibrated camera. Furthermore, the system can estimate the relative distance between the tracking device and the target based on state information associated with the imaging device and the movable object.

The state information includes altitude information of the imaging device carried by the movable object. The altitude information of the imaging device can be received from a control module for the movable object. The state information can include attitude information of the imaging device that is carried by a movable object. The attitude information of the imaging device can be received from a payload stabilization control module, wherein the payload stabilization control module controls a stabilization system, which stabilizes the imaging device on the movable object.

In accordance with various embodiments of the present disclosure, the controller 1405 can obtain a relative distance 1415 between the movable object 1410 and the target 1406 from the image 1403. Also, the controller 1405 can generate one or more flight control signals 1404 to direct the movable object 1410 to track the target 1406. The control signals 1404 can include acceleration/deceleration signals and gimbal attitude adjustment signals. For example, when the movable object 1410 is tracking the target 1406, the controller 1405 can adjust the movable object or the gimbal to rotate about the yaw direction based on the distance between the target and the center point of the image.

Thus, the controller 1405 can maintain a desired tracking distance (which can be a constant distance or dynamically configured distance) from the target 1406. For example, the system can calculate the speed, v_target, of the target relative to the movable object 1410, based on the relative distances of the target from the movable object 1410 at different time points. Then, the system can determine the necessary movement change of the movable object 1410 based on the speed of the movable object 1410, v_uav, and the current relative distance 1415.

Figure 15:
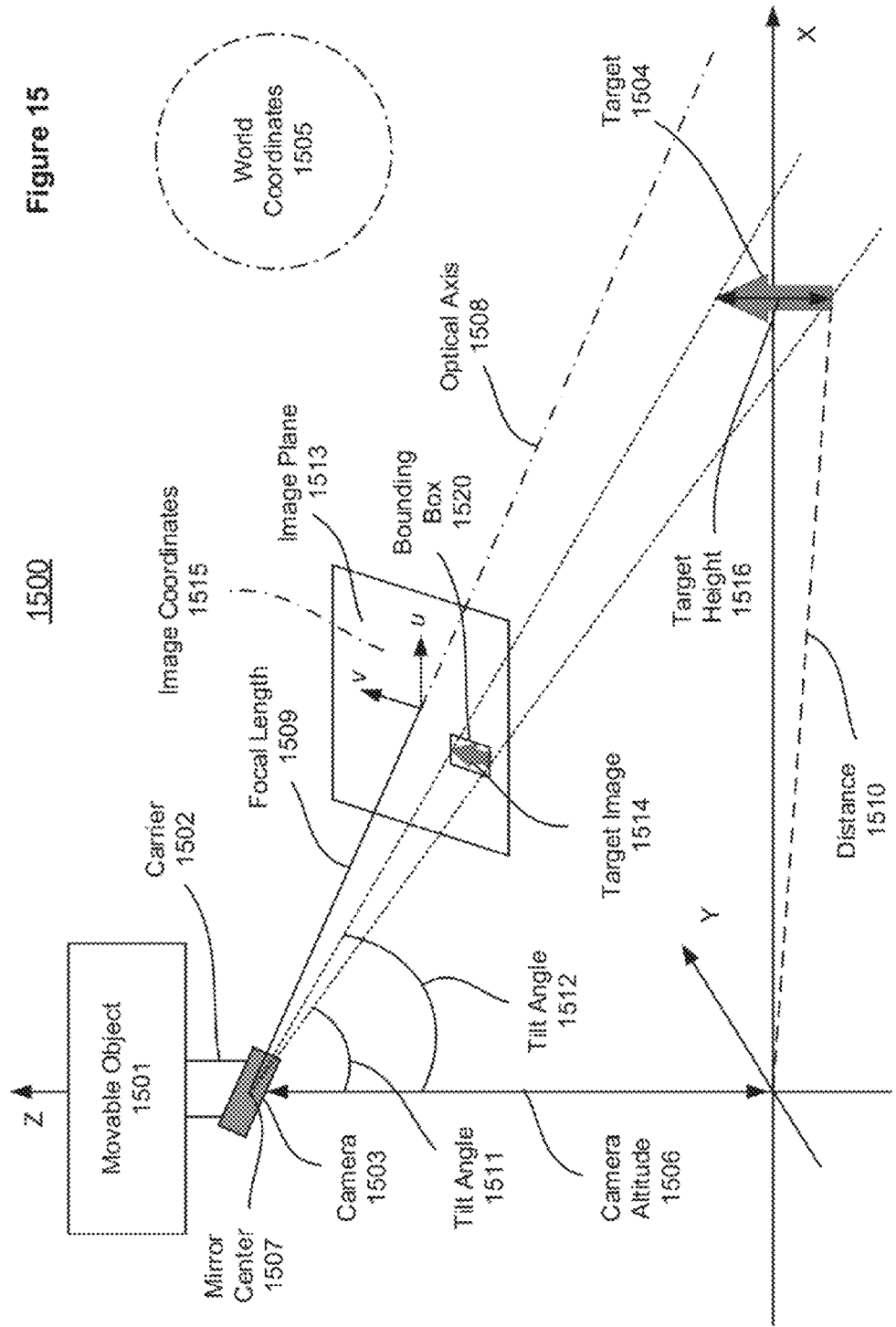
FIG. 15 illustrates measuring relative target distance in a movable object environment, in accordance with various embodiments of the present disclosure.

FIG. 15 illustrates measuring relative target distance in a movable object environment, in accordance with various embodiments of the present disclosure. As shown in FIG. 15, a movable object 1501 in a movable object environment 1500 can include a carrier 1502, which carries an imaging device such as a camera 1503. The camera 1503 can capture an image of the target 1504 on an image plane 1513 with an image coordinates 1515.

In accordance with various embodiments of the present disclosure, the system can take advantage of various distance measuring methods. For example, the distance measuring method can take advantage of a bounding box 1520, which can handle complex geometry shapes and provides continuous and stable results.

As shown in FIG. 15, the imaging of a target may be represented based on an aperture imaging model, which assumes that a light ray from an object point in a three dimensional space can be projected on an image plane to form an image point. The optical axis 1508 can pass through both the mirror center 1507 and the image center. The distance between the mirror center and the image center can be equal or substantial similar to the focal length 1509. For illustration purpose only, the image plane 1513 can be moved to the mirror position on the optical axis 1008 between the mirror center 1507 and the target 1504.

In accordance with various embodiments of the present disclosure, the system can perform an initialization step, which includes estimating both the target distance and target height (automatically). Here, the system can determine the projected relative distance 1510 on the ground between the mirror center 1507 and the target 1504 based on the geometry relationship. Then, the system can determine the target height.

At the initialization stage (i.e. when t=0), the system can assume that the altitude of the movable object 1501 (i.e. the camera 1502) is measured from the same floor (or horizontal line) where the target 1504 stands. Without limitation, when the floor is not a horizontal line, the system can use the effective altitude, which accounts for the altitude difference, to replace the actually measured altitude of the movable object 1501 for measuring the target distance and target height.

In the example as shown in FIG. 15, the target 1504 may have a top target point $(x_t, y_t, z_t)$ and a bottom target point $(x_b, y_b, z_b)$ in a world coordinates 1505, which are projected on the image plane 1513 as a top image point $(u_t, v_t)$ and a bottom image point $(u_b, v_b)$ respectively in the target image 1514. A top line passes through the mirror center 1507, the top image point, and the top target point and can have a tilt angle 1512 from the axis Z of the world coordinates 1505. Also, a bottom line passes through the mirror center 1507, the bottom image point, and the bottom target point and can have a tilt angle 1512 from the axis Z.

Thus, the target top and bottom direction vectors $\vec{T}$ and $\vec{B}$ can be expressed as in the following.

$$\vec{T} = \begin{pmatrix} x_t \\ y_t \\ z_t \end{pmatrix} \sim RK^{-1} \begin{pmatrix} u_t \\ v_t \\ 1 \end{pmatrix}$$

$$\vec{B} = \begin{pmatrix} x_b \\ y_b \\ z_b \end{pmatrix} \sim RK^{-1} \begin{pmatrix} u_b \\ v_b \\ 1 \end{pmatrix}$$

where K represents the intrinsic matrix of the camera, and R represents the camera rotation.

Then, the system can estimate the target distance based on the measured or effective camera altitude 1506 and the position of the bounding box 1520 in the image coordinates 1515. For example, the distance 1510 can be calculated as $d = -h_c/z_b * P_b$, and the target height 1516 can be calculated as $h_o = h_c + z_t d/P_t$, where $P_b$ is the projection length of $\vec{B}$ on the ground and $P_t$ is the projection length of $\vec{T}$ on the ground, which are defined as in the following.

$$P_b = \sqrt{x_b^2 + y_b^2}$$

$$P_t = \sqrt{x_t^2 + y_t^2}$$

After the initialization step, the system can estimate the distance 1510 from the target 1504, even when the target altitude changes (e.g. when the target 1504 is off the ground) and when the altitude of the movable object 1501 (e.g. a UAV) is unknown. This is beneficial, since during the tracking, the object may climb up or go down and the altitude of the UAV may be unreliable as the UAV flies over grasses or climbs up (e.g. 5 meters above the ground).

As shown in FIG. 15, after the initialization, the projected relative distance 1510 on the ground between the target 1501 and the movable object 1501 can be calculated as $h_c/dh$, where dh present the estimate height of the target at a unit distance away from the camera, which can be computed using the following formula.

$$dh = \left\| \frac{\vec{T}}{P_t} - \frac{\vec{B}}{P_b} \right\|$$

Thus, the method can be efficient and may have very few restrictions once it is initialized, since the system can estimate the distance 1510 from the object based on the height of the target 1516 after the initialization.

Furthermore, the system can perform movement control, such as flight control, based on the estimated distance 1510. In accordance with various embodiments of the present disclosure, for a movable object 1501, such as a UAV, the goal for the movement control is maintaining the movable object 1501 within a desired distance from the target 1504 in both the X and Y directions in the world coordinates 1505.

First, the system can smooth the estimated distance 1510 over a time period, e.g. by applying a Kalman filter. Then, the system can calculate the velocity of the target 1504 relative to the movable object 1501, e.g. a UAV, for controlling the tracking of the target 1504 by the movable object 1501.

In accordance with various embodiments of the present disclosure, the system can utilize a proportional-integral-derivative controller (PID controller) for maintaining the distance between the movable object 1501 and the target 1504 within a desired distance, by taking advantage of the relative distance between the movable object 1501 and the target 1504 and their respective velocities. For example, the system can obtain the velocity of the movable object 1501 relative to the ground based on the state information. Also, the system can obtain the velocity of the target 1504 relative to the ground based on the method described above.

Alternatively, the system can control the yaw angle for the movable object 1501 and X direction movement in the world coordinates 1505. For example, the yaw angle θ for the movable object 1501 can be calculated based on dx and dy using the following formula.

$$\theta = \operatorname{atan}\left(\frac{dy}{dx}\right)$$

where dx and dy are the displacement of the movable object 1501 in the X and Y directions in the world coordinates 1505. Then, the system can control the movement of the movable object 1501 based on the measured distance between the movable object 1501 and the target 1504. Additionally, the system can achieve tracking by side, which allows the movable object 1501 to track the target 1504 in a side-by-side fashion for realizing ideal picture capturing.

In accordance with various embodiments of the present disclosure, by further taking into account of the state information of the movable object 1501 and the camera 1507, the above method can be modified for handling the tracking processes when the height of the movable object 1501 is not stable and/or when the roll angle for the camera is not the same (e.g. zero degree).

Figure 16:
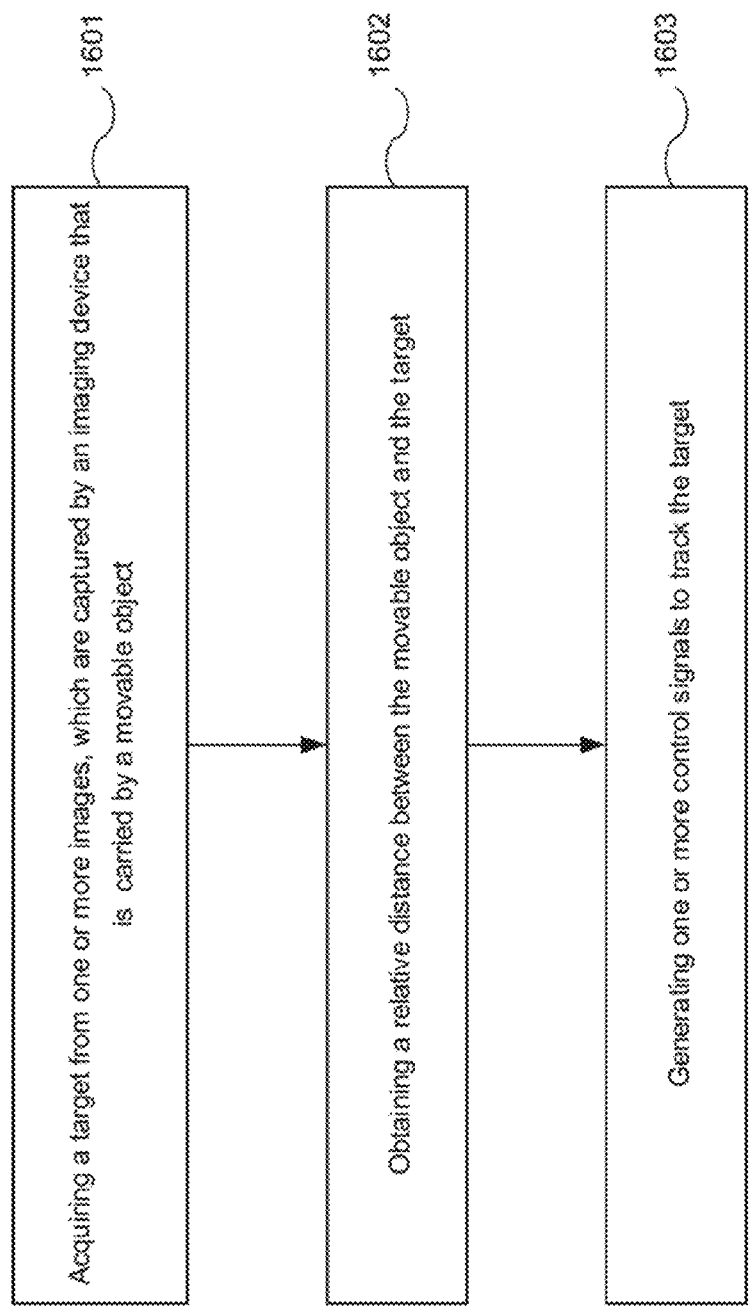
FIG. 16 shows a flowchart of tracking a target based on distance measuring in a movable object environment, in accordance with various embodiments of the present disclosure.

FIG. 16 shows a flowchart of tracking a target based on distance measuring in a movable object environment, in accordance with various embodiments of the present disclosure. As shown in FIG. 16, at step 1601, the system can acquire a target from one or more images, which are captured by an imaging device that is carried by a movable object. Then, at step 1602, the system can obtain a relative distance between the movable object and the target. Furthermore, at step 1603, the system can generate one or more control signals to track the target.

In accordance with the present disclosure, there is also provided a method for supporting target tracking including obtaining a feature model for a target. The feature model represents imagery characteristics of the target. The method further includes extracting one or more features from one or more images that are captured by an imaging device carried by a movable object, and applying the feature model on said one or more features to determine similarity.

In some embodiments, the method further includes acquiring the target based on an initialization image captured by an imaging device, which is carried by the movable object.

In some embodiments, the method further includes receiving a selected point in the initialization image from a user, and providing a plurality of object proposal candidates to the user. Each said object proposal is represented using a bounding box. The method also includes receiving a selected object proposal for the target from the user.

In some embodiments, the method further includes determining the feature model based on the object proposal that is selected by the user.

In some embodiments, the feature model is represented in spatial domain and/or frequency domain.

In some embodiments, said one or more features are extracted from a searching window in said one or more images.

In some embodiments, the method further includes calculating correlation between the feature model and each feature extracted from said one or more images, and/or matching said one or more features with the feature model.

In some embodiments, the method further includes obtaining a projective transformation of the target in said one or more images, based on state information of the imaging device.

In some embodiments, the state information of the imaging device is determined based on position and attitude information of the movable object and attitude information of the imaging device.

In some embodiments, the position and attitude information of the movable object are received from a control module for the movable object, and attitude information of the imaging device is received from a payload stabilization control module, wherein the payload stabilization control module controls a stabilization system, which stabilizes the imaging device on the movable object.

In some embodiments, the method further includes applying a perspective transformation on the feature model to compensate for the projective transformation of the target in said one or more images.

In some embodiments, the method further includes applying a reverse perspective transformation on said one or more images to compensate for a projective transformation of the target.

In some embodiments, the reverse perspective transformation is determined based on a pitch angle of the image device.

In some embodiments, the method further includes updating the feature model based on the matching of said one or more features with the feature model, wherein the updated feature model is adapted to be applied on a subsequent image.

Also in accordance with the present disclosure, there is provided a system for supporting target tracking, including one or more microprocessors, and a controller running on the one or more microprocessors, wherein the controller operates to obtain a feature model for a target. The feature model represents imagery characteristics of the target. The controller also operates to extract one or more features from one or more images that are captured by an imaging device carried by a movable object, and apply the feature model on said one or more features to determine similarity.

In some embodiments, the controller operates to acquire the target based on an initialization image captured by an imaging device, which is carried by the movable object.

In some embodiments, the controller operates to receive a selected point in the initialization image from a user, and provide a plurality of object proposal candidates to the user. Each said object proposal is represented using a bounding box. The controller further operates to receive a selected object proposal for the target from the user.

In some embodiments, the controller operates to determine the feature model based on the object proposal that is selected by the user.

In some embodiments, the feature model is represented in spatial domain and/or frequency domain.

In some embodiments, said one or more features are extracted from a searching window in said one or more images.

In some embodiments, the controller operates to calculate correlation between the feature model and each feature extracted from said one or more images, and/or match said one or more features with the feature model.

In some embodiments, the controller operates to obtain a projective transformation of the target in said one or more images, based on state information of the imaging device.

In some embodiments, the state information of the imaging device is determined based on position and attitude information of the movable object and attitude information of the imaging device.

In some embodiments, the position and attitude information of the movable object are received from a control module for the movable object, and attitude information of the imaging device is received from a payload stabilization control module, wherein the payload stabilization control module controls a stabilization system, which stabilizes the imaging device on the movable object.

In some embodiments, the controller operates to apply a perspective transformation on the feature model to compensate for the projective transformation of the target in said one or more images.

In some embodiments, the controller operates to apply a reverse perspective transformation on said one or more images to compensate for a projective transformation of the target.

In some embodiments, the reverse perspective transformation is determined based on a pitch angle of the image device.

In some embodiments, the controller operates to update the feature model based on the matching of said one or more features with the feature model, wherein the updated feature model is adapted to be applied on a subsequent image.

Also in accordance with the present disclosure, there is provided a non-transitory computer-readable medium with instructions stored thereon, that when executed by a processor, perform the steps including obtaining a feature model for a target. The feature model represents imagery characteristics of the target. The instructions further perform the steps including extracting one or more features from one or more images that are captured by an imaging device carried by a movable object, and applying the feature model on said one or more features to determine similarity.

Also in accordance with the present disclosure, there is provided a system for supporting target tracking including an imaging device on a movable object. The imaging device operates to capture one or more images. The movable object operates to obtain a feature model for a target. The feature model represents imagery characteristics of the target. The movable object further operates to extract one or more features from said one or more images that are captured by an imaging device carried by a movable object, and apply the feature model on said one or more features to determine similarity.

Also in accordance with the present disclosure, there is provided a method for supporting target tracking including applying a feature model for a target on an image that is captured for tracking a target to generate a tracking output, determining that a tracking failure occurs based on the tracking output, and checking one or more subsequent images to detect the target.

In some embodiments, the method further includes obtaining the feature model, which represents imagery characteristics of the target in spatial domain and/or frequency domain.

In some embodiments, the tracking output is a feature response map, which is generated for a searching window in the image.

In some embodiments, each point in the feature response map represents a correlation between one or more features extracted from the searching window and the feature model for the target.

In some embodiments, the correlation is calculated in the spatial domain and/or the frequency domain.

In some embodiments, said one or more features are extracted from a patch of image points within the searching window.

In some embodiments, the method further includes obtaining an indicator based on the feature response map, wherein the indicator indicates when the tracking failure occurs.

In some embodiments, the method further includes obtaining a set of object proposal candidates for the target in a subsequent image, using one or more filters to reduce the set of object proposal candidates, determining an optimal object proposal based on correlation that is calculated for the reduced set of object proposal candidates, and/or computing confidence for the optimal object proposal.

In some embodiments, the method further includes updating the feature model based on the optimal object proposal when the target is detected, and tracking the target based on the updated feature model.

In some embodiments, determining that a tracking failure occurs when an value of the peak to sidelobe ratio for the feature response map is below a threshold.

In some embodiments, the method further includes determining that the target is detected in a subsequent image, when the peak to sidelobe ratio for a feature response map associated with the optimal object proposal exceeds the threshold.

In some embodiments, the method further includes using a sliding window to extract one or more features from different portions of the image.

In some embodiments, the method further includes matching the feature model with said one or more features extracted from different portions of the image.

In some embodiments, the method further includes using one or more positioning devices to maintain the movable object with a proximity of the target when the tracking failure occurs.

Also in accordance with the present disclosure, there is provided a system for supporting target tracking, including one or more microprocessors and a controller running on the one or more microprocessors. The controller operates to apply a feature model for a target on an image that is captured for tracking a target to generate a tracking output, determine that a tracking failure occurs based on the tracking output, and check one or more subsequent images to detect the target.

In some embodiments, the controller operates to obtain the feature model, which represents imagery characteristics of the target in spatial domain and/or frequency domain.

In some embodiments, the tracking output is a feature response map, which is generated for a searching window in the image.

In some embodiments, each point in the feature response map represents a correlation between one or more features extracted from the searching window and the feature model for the target.

In some embodiments, the correlation is calculated in the spatial domain and/or the frequency domain.

In some embodiments, said one or more features are extracted from a patch of image points within the searching window.

In some embodiments, the controller operates to obtain an indicator based on the feature response map, wherein the indicator indicates when the tracking failure occurs.

In some embodiments, the controller operates to obtain a set of object proposal candidates for the target in a subsequent image, use one or more filters to reduce the set of object proposal candidates, determine an optimal object proposal based on correlation that is calculated for the reduced set of object proposal candidates, and/or compute confidence for the optimal object proposal.

In some embodiments, the controller operates to update the feature model based on the optimal object proposal, when the target is detected; and track the target based on the updated feature model.

In some embodiments, the controller operates to determine that a tracking failure occurs when an value of the peak to sidelobe ratio for the feature response map is below a threshold.

In some embodiments, the controller operates to determine that the target is detected in a subsequent image, when the peak to sidelobe ratio for a feature response map associated with the optimal object proposal exceeds the threshold.

In some embodiments, the controller operates to use a sliding window to extract one or more features from different portions of the image.

In some embodiments, the controller operates to match the feature model with said one or more features extracted from different portions of the image.

In some embodiments, the controller operates to use one or more positioning devices to maintain the movable object with a proximity of the target when the tracking failure occurs.

Also in accordance with the present disclosure, there is provided a non-transitory computer-readable medium with instructions stored thereon, that when executed by a processor, perform the steps comprising applying a feature model for a target on an image that is captured for tracking a target to generate a tracking output, determining that a tracking failure occurs based on the tracking output, and checking one or more subsequent images to detect the target.

Also in accordance with the present disclosure, there is provided a system for supporting target tracking, including an imaging device on a movable object. The imaging device operates to capture one or more images. The movable object operates to apply a feature model for a target on an image that is captured for tracking a target to generate a tracking output, determine that a tracking failure occurs based on the tracking output, and check one or more subsequent images to detect the target.

Many features of the present disclosure can be performed in, using, or with the assistance of hardware, software, firmware, or combinations thereof. Consequently, features of the present disclosure may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, features of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for supporting target tracking, comprising:
acquiring a target from one or more images, which are captured by an imaging device that is carried by a movable object, including:
obtaining a plurality of object proposal candidates;
comparing aspect ratios of the object proposal candidates with an aspect ratio of an initial object bounding box to filter out object proposal candidates that have an aspect ratio out of a certain range;
calculating a correlation in a spatial domain for remaining object proposal candidates;
selecting one of the remaining object proposal candidates as a bounding box based on the correlation; and
using the bounding box to define the target in said one or more images;
obtaining a relative distance between the movable object and the target; and
generating, based on the relative distance, one or more control signals to direct the movable object to track the target.

2. The method of claim 1, further comprising:
estimating the relative distance between the tracking device and the target based on state information associated with the imaging device and the movable object.

3. The method of claim 2, wherein:
the state information includes altitude information of the movable object and attitude information of the imaging device.

4. The method of claim 3, wherein:
the altitude information of the imaging device is received from a control module for the movable object, and the attitude information of the imaging device is received from a payload stabilization control module, wherein the payload stabilization control module controls a stabilization system, which stabilizes the imaging device on the movable object.

5. The method of claim 1, wherein:
the control signals include acceleration/deceleration signals and gimbal attitude adjustment signals.

6. The method of claim 1, further comprising:
using a positioning system to maintain the target within a proximity of the target.

7. The method of claim 1, further comprising:
configuring an initialization for a measurement of the relative distance between the movable object and the target, the initialization including a measurement of a vertical size of the target.

8. The method of claim 7, further comprising:
using the vertical size of the target to estimate the relative distance between the movable object and the target after the initialization.

9. The method of claim 8, further comprising:
applying a perspective transformation on the vertical size of the target after the movable object changes altitude and attitude.

10. The method of claim 9, further comprising:
obtaining a velocity of the target relative to the movable object.

11. The method of claim 9, further comprising:
tracking the target based on the velocity of the target relative to the movable object.

12. The method of claim 9, further comprising:
controlling a yaw angle movement and a translational movement of the movable object.

13. A system for supporting target tracking, comprising:
one or more microprocessors; and
a controller running on the one or more microprocessors, wherein the controller operates to
acquire a target from one or more images, which are captured by an imaging device that is carried by a movable object, including:
obtaining a plurality of object proposal candidates;
comparing aspect ratios of the object proposal candidates with an aspect ratio of an initial object bounding box to filter out object proposal candidates that have an aspect ratio out of a certain range;
calculating a correlation in a spatial domain for remaining object proposal candidates;
selecting one of the remaining object proposal candidates as a bounding box based on the correlation; and
using the bounding box to define the target in said one or more images;
obtain a relative distance between the movable object and the target; and
generate, based on the relative distance, one or more control signals to direct the movable object to track the target.

14. The system of claim 13, wherein:
the controller operates to estimate the relative distance between the tracking device and the target based on state information associated with the imaging device and the movable object.

15. The system of claim 14, wherein:
the state information includes altitude information of the movable object and attitude information of the imaging device.

16. The system of claim 15, wherein:
the altitude information of the imaging device is received from a control module for the movable object, and the attitude information of the imaging device is received from a payload stabilization control module, wherein the payload stabilization control module controls a stabilization system, which stabilizes the imaging device on the movable object.

17. The system of claim 16, wherein:
the control signals include acceleration/deceleration signals and gimbal attitude adjustment signals.

18. The system of claim 13, wherein:
the controller operates to use a positioning system to maintain the target within a proximity of the target.

19. The system of claim 13, wherein the controller further operates to:
configure an initialization for a measurement of the relative distance between the movable object and the target, the initialization including a measurement of a vertical size of the target.

20. The system of claim 19, wherein:
the controller operates to use the vertical size of the target to estimate the relative distance between the movable object and the target after the initialization.

21. The system of claim 20, wherein:
the controller operates to apply a perspective transformation on the vertical size of the target after the movable object changes altitude and attitude.

22. The system of claim 13, wherein:
the controller operates to obtain a velocity of the target relative to the movable object.

23. The system of claim 13, wherein:
the controller operates to track the target based on the velocity of the target relative to the movable object.

24. The system of claim 13, wherein:
the controller operates to control a yaw angle movement and a translational movement of the movable object.

25. A non-transitory computer-readable medium with instructions stored thereon, that when executed by a processor, perform the steps comprising:
acquiring a target from one or more images, which are captured by an imaging device that is carried by a movable object, including:

obtaining a plurality of object proposal candidates;

comparing aspect ratios of the object proposal candidates with an aspect ratio of an initial object bounding box to filter out object proposal candidates that have an aspect ratio out of a certain range;

calculating a correlation in a spatial domain for remaining object proposal candidates;

selecting one of the remaining object proposal candidates as a bounding box based on the correlation; and using the bounding box to define the target in said one or more images;

obtaining a relative distance between the movable object and the target; and generating, based on the relative distance, one or more control signals to direct the movable object to track the target.

26. A system for supporting first person view (FPV), comprising:

an imaging device on a movable object, wherein the imaging device operates to capture one or more images; and wherein the movable object operates to acquire a target from said one or more images, including:

obtaining a plurality of object proposal candidates;

comparing aspect ratios of the object proposal candidates with an aspect ratio of an initial object bounding box to filter out object proposal candidates that have an aspect ratio out of a certain range;

calculating a correlation in a spatial domain for remaining object proposal candidates;

selecting one of the remaining object proposal candidates as a bounding box based on the correlation; and using the bounding box to define the target in said one or more images;

obtain the relative distance between the movable object and the target; and generate, based on the relative distance, one or more control signals to direct the movable object to track the target.

* * * * *